United States Patent [19]
Stevens et al.

[11] 3,931,612
[45] Jan. 6, 1976

[54] SORT APPARATUS AND DATA PROCESSING SYSTEM

[75] Inventors: William W. Stevens; Donald J. Ruder, both of Atherton, Calif.

[73] Assignee: Triad Systems Corporation, Menlo Park, Calif.

[22] Filed: May 10, 1974

[21] Appl. No.: 468,811

[52] U.S. Cl. ............................ 340/172.5; 340/146.2
[51] Int. Cl.² .......................................... G06F 7/02
[58] Field of Search ....... 340/172.5, 146.2; 235/177

[56] References Cited
UNITED STATES PATENTS

| | | | |
|---|---|---|---|
| 3,636,519 | 1/1972 | Heath | 340/172.5 |
| 3,719,931 | 3/1973 | Schroeder | 340/172.5 |
| 3,740,538 | 6/1973 | Hemphill | 235/177 |
| 3,794,974 | 2/1974 | Henn et al. | 235/177 |
| R27,119 | 4/1971 | Seeber, Jr. et al. | 340/172.5 |

*Primary Examiner*—Leo H. Boudreau
*Assistant Examiner*—Michael C. Sachs
*Attorney, Agent, or Firm*—Flehr, Hohbach, Test, Albritton & Herbert

[57] ABSTRACT

Disclosed is a system for sorting information such as used, for example, in inventory control. New items to be sorted are fetched from a memory unit and are stored as buffered items in buffer stores. Comparators compare each new item from the memory unit with each of the buffered items in the buffer stores and with a lower limit and an upper limit. Item sort address registers store addresses which define the sorted order of the items in the buffer stores. After comparison of each new item, the item sort address registers are updated by the results of the comparison to establish a new sorted order and to cause rejected buffered items to be deleted from the buffer stores to make room for accepted new items. Reformatting apparatus is provided for reformatting items from the memory unit which have variable length and different weight fields such as prefix, body and suffix fields. Apparatus is provided for recognizing control fields which cause items to be ignored or included within the sorting process.

30 Claims, 5 Drawing Figures

SORT APPARATUS AND DATA PROCESSING SYSTEM

In accordance with the above background of the invention, it is an object of the present invention to provide a method and apparatus for improved sorting and particularly one capable of sorting items having variable field lengths and variable field significance capable of reformatting the fields for sorting.

SUMMARY OF THE INVENTION

The present invention is a sorting method and apparatus. Items to be sorted are identified by an order intrinsic to the item. The items to be sorted are stored in a memory unit in a sequence which can be completely unordered. The items are fetched from the memory unit for processing.

New fetched items from the memory unit are stored in buffer stores and hence become buffered items. Comparators are provided for comparing the buffered items from the buffer stores with new items from the memory unit. Selection apparatus is provided for connecting the buffer stores to the comparators to enable comparison of the new items with the buffered items. Item sort address apparatus is provided for controlling the selection apparatus and thereby to establish the connection pattern of buffer stores to comparators. The address apparatus stores an item sort address for each buffer store thereby defining the connection pattern which specifies which buffer store is connected to which comparator. The order of the addresses in the address apparatus after processing establishes the sorted order of the items in the buffer stores.

Transfer apparatus is provided for transferring addresses in the address apparatus for updating the sorted order of the buffered items in response to each comparison.

The sorting unit additionally includes a lower limit store and an upper limit store for defining the boundaries of the sorting operation between an upper and lower limit. An upper limit comparator and a lower limit comparator are provided for comparing each new item from the memory unit with the upper and lower limit.

The sorting unit also includes means for storing condition fields in the form of codes and flags. In one embodiment, search codes and search flags are stored in the upper limit store which also stores the upper limit item. Items to be sorted include item flags and item codes which are compared with the search codes and the search flags during a sorting operation. The results of comparing the item codes and flags with the search codes and flags further qualifies the search.

The sorting apparatus of the invention operates in accordance with the following method. A new item to be sorted is fetched from the memory unit and is compared with each item in the buffer stores, with the lower limit and with the upper limit, and flags and codes are compared. Whenever an item is between the lower limit and the upper limit and has an order between buffered items in the buffer stores, the new item is retained in a buffer store provided all other control conditions are satisfied. Less significant buffered items are replaced by more significant new items. The sorted order of buffered items in the buffer stores is determined by means of indirect addressing using transferable item sort addresses. All items in the memory unit are fetched and compared with buffered items. Each new item having a lower order than a buffered item in the buffer stores is retained, provided the control conditions of the flags and codes are satisfied, causing the removal of higher order buffered items.

After a comparison of all items in the memory unit, the buffer stores are filled with the lowest order set of memory unit items between the lower limit and the upper limit which satisfy the code and flag control conditions. After each comparison of all items in the memory unit, the highest order one of the set of items remaining in the buffer stores is stored as a new lower limit and the sort processing is repeated for all items in the memory unit. After all items in the memory unit have been compared on the repeated processing, a new set of lower order items is retained in the buffer stores. The highest order one of the new set is stored as a new lower limit and the sort processing is again repeated. Each time the memory unit is completely searched, a new lower order set is determined and a new lower limit, higher than the last, is selected. At any time after a complete search of the memory unit the buffer stores are not filled, the sort sequence is terminated since all items between the initial lower limit and the upper limit have been found.

An additional feature of the present invention includes means for reformatting items in the memory unit before the sort processing. In one embodiment, items in the memory unit are characterized by having a line, a prefix, a body and a suffix field. The reformat apparatus recognizes the location of the start of each field and provides for the ordered significance of each field.

In accordance with the above summary of the invention, the present invention achieves the objective of providing an improved sorting method and apparatus which employs indirect addressing, variable field lengths, variable orders of those fields and which provides conditions in the form of flags and codes for including or eliminating items from the sort sequencing.

Additional objects and features of the invention will appear from the following description in which the preferred embodiments of the invention have been set forth in detail in conjunction with the drawings.

DETAILED DESCRIPTION

Figure 1:
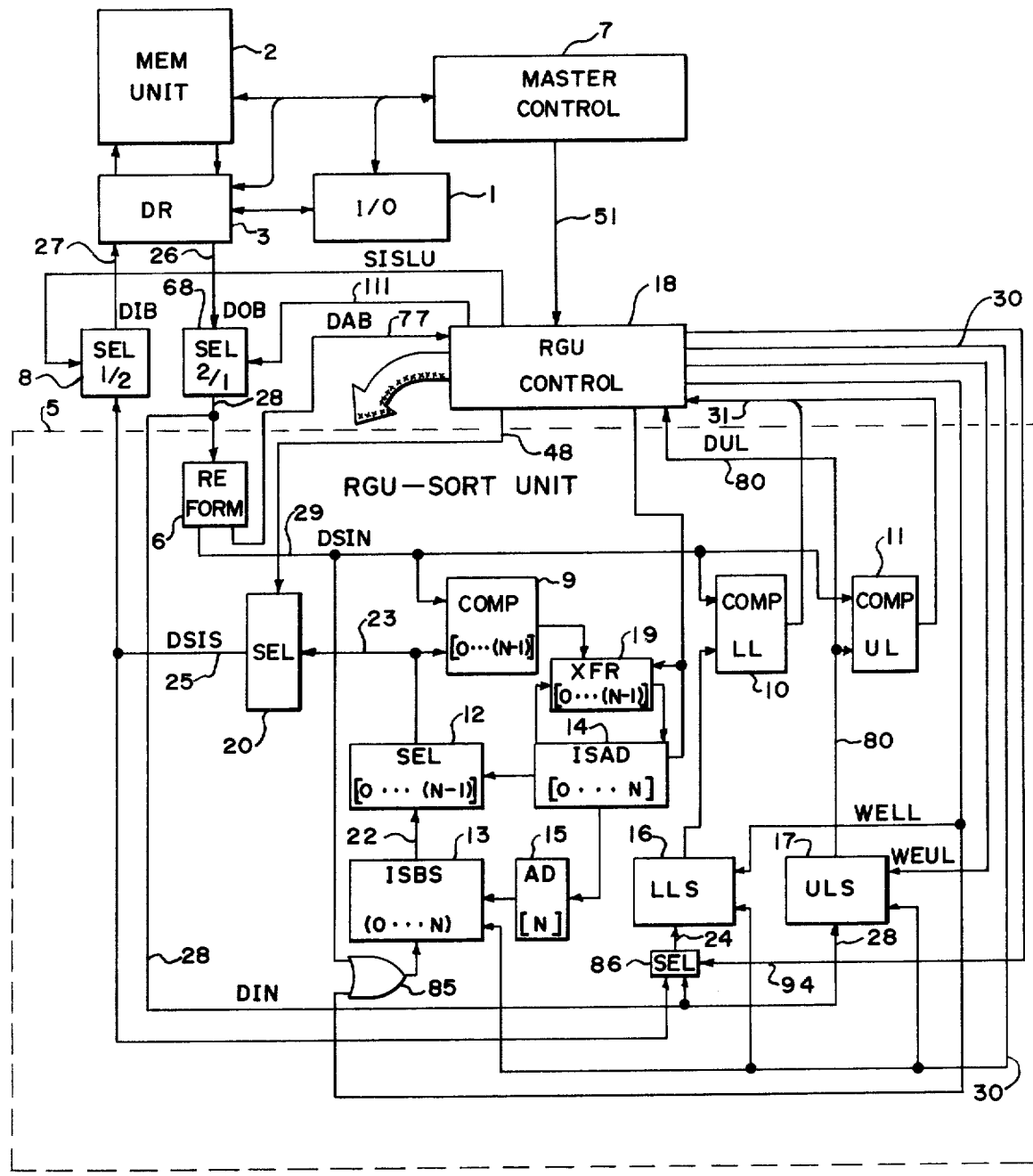
FIG. 1 depicts an overall block diagram of a sort apparatus in accordance with the present invention.

Overall System — FIG. 1

In FIG. 1, the overall sort apparatus in accordance with the present invention is shown. The apparatus includes a memory unit 2 for storing items to be sorted. Memory unit 2 is typically a magnetic disc unit which has a storage capacity of 48 million bits or more of data. In a typical embodiment, the items stored in memory unit 2 are part numbers and associated information useful in inventory records and processing. The information in the memory unit 2 is one embodiment is organized into sectors where each sector consists of fifteen record items, for example, 15 part number records. Each record item consists of seventeen bytes (8 bits per byte) which are further divided into 16 part number bytes and one pointer byte. The part numbers typically have several fields of different lengths such as a line, a prefix, a body and a suffix. The pointer byte identifies the location of the field boundaries. In one example, the pointer byte includes two 4-bit fields, one which identifies the boundary between the prefix and body and the other which identifies the boundary between the body and suffix in the sixteen part number the data bytes. The items to be sorted are all record items or some set of the record items in the memory unit 2. The sorting of items is carried out with respect to limits bounded by an upper limit and a lower limit and qualified by control conditions stored as coded and flags.

Information is transferred in and out of the memory unit 2 via a conventional data register means 3. Data register means 3 typically includes two or more registers for receiving a data out bus(DOB) 26 and a data in bus(DIB) 28.

In one preferred embodiment, the data out bus 26 and the data in bus 28 are 2 bits wide providing input and output data serially by 2 bits parallel. Of course, the serial or parallel nature of the data and the bus width in and out of memory unit 2 is arbitrary in accordance with the desired data rate and the particular capabilities of the memory apparatus employed.

The data out bus 26 connects from the register 3 to a select circuit 68. Circuit 68 converts the two bits parallel to serial-by-bit on DIN line 28. The DIN line 28 is input to reformat circuit 6 which reformats record items output from memory unit 2.

MEMORY UNIT DATA FORMAT

Each record item in memory unit 2 of FIG. 1 includes seventeen 8-bit bytes. The first byte, BYTE 00, identifies field boundaries in the remaining 16 data bytes, BYTE 0 through BYTE 15. The organization of data within each record item in memory unit 2 is shown in the following CHART I. In CHART I, each of the bytes BYTE 00, BYTE 0, BYTE 1, . . ., BYTE 15 includes the eight bits BIT 0, . . ., BIT 7.

BYTE 00 in memory unit 2 includes a 4-bit S1 count in bits BIT 0, . . ., BIT 3 and includes a 4-bit S2 count in bits BIT 4, . . ., BIT 7. The S1 field defines the boundary between the suffix and the body and the S2 field defines the boundary between the body and the prefix.

In BYTE 0, the six bits BIT 0, . . ., BIT 5 store the 6-bit D0 data field. In Byte 0, the bit BIT 6 is blank and the bit BIT 7 stores a 1-bit flag F0.

In BYTE 1, the 6 bits BIT 0, . . ., BIT 5 store the 6-bit D1 data field, the bit BIT 6 is blank and the bit BIT 7 stores a 1-bit flag F1.

In BYTE 2, the six bits BIT 0, . . ., BIT 5 store the 6-bit data field D2, the bit BIT 6 stores one bit of a 6-bit C1 code field and the bit BIT 7 stores a 1-bit flag F2.

In a similar manner, each of the remaining bytes in CHART I store the indicated fields. Specifically, BIT 6 in each of the bytes BYTE 2, . . ., BYTE 7 stores one bit of the 6-bit C1 field. BIT 6 in each of the bytes BYTE 8, . . ., Byte 11 stores one bit of the 4-bit C2 code field and BIT 6 of each of the bytes BYTE 12, . . ., BYTE 15 stores one bit of the 4-bit C3 field. BIT 7 for each of the bytes BYTE 0, . . ., BYTE 15 stores the 1-bit flags F0, . . ., F15, respectively.

The reformatting operation performed by reformat circuit 6 expands the sixteen data bytes in a record item from the compact format shown in CHART I an expanded format shown hereinafter in CHART IIA. The expanded format consists of 32 bytes including up to four data fields with field alignment and with flag and code control fields. The four data fields are a suffix field which is up to nine characters long (four bits per character), a body field which is up to eleven characters long, a prefix field which is up to the nine characters long and a line field which consists of the last three characters of the record item. The control fields include 16 1-bit flags, a 6-bit C1 code, a 4-bit C2 code and a 4-bit C3 code. The reformatting of data fields is carried out based upon the field boundaries specified in the first byte of each record item. The first byte (BYTE 00 in CHART I) includes two 4-bit pointers (S1, S2) which specify the byte locations which identify the beginning of the body and the beginning of the prefix in the new format. The outputs from reformat circuit 6 are the DAB line 77 and the DSIN line 29. The reformatted information of DAB line 77 as shown in CHART IIA connects the new item flags and codes to control 18. The DSIN line connects the reformatted data fields and memory unit address information as shown in the CHART IIB hereinafter to comparators 9, 10 and 11 and to buffer stores 13.

The DIN bus 28 is employed to initially load a lower limit store (LLS) 16 and an upper limit store (ULS) 17 with a lower limit and an upper limit which define the bounds over which a sort is carried out. The initial loading of the stores 16 and 17 occurs prior to the sort sequencing and is carried out under control of the master control 7. In one embodiment, stores 16 and 17 are each 256-bit random access memories for storing eight 32-bit bytes. The stores 16 and 17 store data presented serially by bit on lines 24 and 28, respectively, at locations defined by address bus 30, when enabled by lines WELL and WEUL, respectively. The lower limit store 16 receives its data input on line 24

CHART I

|     |   | BYTE |    |    |    |    |    |    |    |    |    |    |     |     |     |     |     |     |
|-----|---|------|----|----|----|----|----|----|----|----|----|----|-----|-----|-----|-----|-----|-----|
|     |   | 00   | 0  | 1  | 2  | 3  | 4  | 5  | 6  | 7  | 8  | 9  | 10  | 11  | 12  | 13  | 14  | 15  |
|     | 7 | S2   | F0 | F1 | F2 | F3 | F4 | F5 | F6 | F7 | F8 | F9 | F10 | F11 | F12 | F13 | F14 | F15 |
|     | 6 | S2   |    |    | C1 | C1 | C1 | C1 | C1 | C1 | C2 | C2 | C2  | C2  | C3  | C3  | C3  | C3  |
|     | 5 | S2   | D0 | D1 | D2 | D3 | D4 | D5 | D6 | D7 | D8 | D9 | D10 | D11 | D12 | D13 | D14 | D15 |
|     | 4 | S2   | D0 | D1 | D2 | D3 | D4 | D5 | D6 | D7 | D8 | D9 | D10 | D11 | D12 | D13 | D14 | D15 |
| BIT |   |      |    |    |    |    |    |    |    |    |    |    |     |     |     |     |     |     |
|     | 3 | S1   | D0 | D1 | D2 | D3 | D4 | D5 | D6 | D7 | D8 | D9 | D10 | D11 | D12 | D13 | D14 | D15 |
|     | 2 | S1   | D0 | D1 | D2 | D3 | D4 | D5 | D6 | D7 | D8 | D9 | D10 | D11 | D12 | D13 | D14 | D15 |
|     | 1 | S1   | D0 | D1 | D2 | D3 | D4 | D5 | D6 | D7 | D8 | D9 | D10 | D11 | D12 | D13 | D14 | D15 |
|     | 0 | S1   | D0 | D1 | D2 | D3 | D4 | D5 | D6 | D7 | D8 | D9 | D10 | D11 | D12 | D13 | D14 | D15 | from selection circuit 86. Selection circuit 86 receives an initial lower limit before sort processing from DIN line 28. After processing commences, new lower limit values are provided on the data sorted item sort(DSIS) line 25. The selection of line 25 or line 28 is made in circuit 86 in response to a signal on control line 94.

The DSIN line 29 output from reformat circuit 6 connects as an input to the item sort buffer stores (ISBS) 13. Each of the (N+1) stores 13 stores one buffered record item being sorted. In an example wherein each data portion of a record item is 32 bytes, each of the (N+1) stores 13 includes 256 bits of random access storage. The stores 13 are selected one at a time to store a new item presented on DSIN line 29. Line 29 connects through OR gate 85 to stores 13. Also, OR gate 85 receives the WELL signal to load all 1's into buffer stores 13 whenever lower limit store 16 is loaded with a new lower limit. The store selected for storage is determined by the selection circuitry 15 which provides (N+1) outputs where only one of those outputs is energized at any one time. The data on the DSIN line 29 is stored at a location in a store 113 specified by an address on address bus 30. In an example of 32 bytes, bus 30 is 8 binary address bits.

Selection circuit 15 is conventional circuitry such as a gated decoder which selects one out of N+1 locations in response to an address from one address register in the item sort address registers(ISAD) 14.

The item sort address(ISAD) registers 14 store (N+1) addresses, one associated with each of the buffered items in the (N+1) buffer stores 13. One of the (N+1) addresses controls the operation of the selection circuit 15 for specifying in which buffer store a new item is to be loaded. The other N addresses in registers 14 control the N selection circuits 12. The addresses in registers 14 are transferred by operation of the transfer circuits 19 thereby changing the order of the addresses in registers 14.

In an example where N equals seven, the eight registers 14 each include three binary address bits. Each of the N selection circuits 12 functions to connect a different one of the (N+1) buffer stores 13 to the N comparators 9. The one buffer store 13 which is not connected to a comparator receives and stores the new item from the DSIN line 29. Each of the selection circuits 12 is connected to a different associated item sort address register of the registers 14. Each of the N selection circuits 12 always receives its item sort address from the same one of the registers 14. The buffer stores 13 are not always connected to the same comparators 9, however, but each is connected to a comparator determined by the contents of the associated address register 14. The order of connecting buffer stores 13 to comparators 9, therefore, is altered by changing the order of item sort addresses in the registers 14. Each of the registers 14 stores a different item sort address.

The comparators 9 include N comparators each capable of making the determinations of whether a new item on DSIN line 29 is greater than, less than or equal to the buffered items currently stored in buffer stores 13. In one preferred embodiment, the comparison is on a bit-by-bit basis. For 256-bit items, each of the N comparators 9 receives 256 bits serially input from a new item on DSIN line 29 concurrently with 256 bits serially input from a selected buffered item from one of the buffer stores 13. In this manner, the comparators 9 compare each buffered item with each new item. The outputs from the N comparators 9 are input to the N transfer circuits 19 to control the transfer of item addresses.

Not all the comparison results from comparators 9 are utilized. Only comparisons for 6 bits (BITS 0, ..., 5) out of 8 bits for each of the 32 8-bit bytes input to comparators 9 are utilized. Those 6 bits are typically a standard ASCII code. The other 2 bits (BIT 6, BIT 7) for each byte are either unused or are utilized for comparing control fields in the form of flags and codes. Item flags and codes from a new item are connected on DAB line 77 from reformat circuit 6 to control 18 and search flags and codes are connected from upper limit store 17 to control 18. The flags and codes appearing in two out of eight bits are compared in control 18. The results of that comparison permits or inhibits the transfer of item addresses by transfer circuits 19.

Transfer circuits 19 control the transfer of item sort addresses among the ISAD registers 14. The transfer is carried out with a sorting sequence which proceeds from lower order toward higher order. When a new item is found to be greater than the adjacent item on one side (left) but less than the adjacent item on the other side (right), the item address of the lesser item (on left) is not transferred but the address of the greater item (on right) is transferred out making room for the new item address. In this sorting sequence, the higher order item addresses are shifted out (toward the right). The highest order item in the buffer store is always the one replaced whenever room must be made in the buffer stores for a new item which is lower than some item in the buffer store. After all new items (for example, all items in memory unit 2) have been processed, the items retained in the buffer stores 13 are the lowest order set of all new items processed. The order of items in the buffer stores 13 are determined by the order of item addresses in registers 14.

The lower limit store 16 and the upper limit store 17 connect as inputs to the lower limit comparator 10 and the upper limit comparator 11, respectively. The comparators 10 and 11 are similar to each of the N comparators 9 and provide a less than, equal to or greater than determination. Comparators 10 and 11 compare each new item from the memory unit 2 on the DSIN bus 29 with the lower and upper limits, respectively, and provide outputs on bus 31 to the control 18. Control 18 inhibits transfers by circuits 19 in the address registers 14 whenever the new item on bus 29 is not between the lower and upper limits. Control 18 also inhibits transfers by circuits 19 in response to results of comparisons of item control fields on line DAB 77 and search control fields on DUL line 80.

After all of the new items from memory unit 2 have been processed using the initial lower limit and upper limit, the contents of the N buffer stores 13 specified by selection circuits 12 are the N lowest order items of all new items from the memory unit 2 between the initial upper and lower limits. Select out circuitry 20 is provided to select the N outputs from the selection circuits 12. The selection circuits 12 are read out one at a time to obtain the buffered items from buffer stores 13. Selection out circuitry 20 is addressed by input lines 48 from control 18. In the example where N is 7, lines 48 are a 3-bit bus. If the selection circuits 12 are accessed in order by the selection out circuitry 20, the resulting sequence of selecting the buffer stores 13 is controlled by the item addresses in registers 14. The buffer stores 13 are not generally selected in any physical sequence since the order in which they are selected is controlled by the sorted order of item addresses in registers 14. The order of the item addresses causes the buffered items from the buffer stores 13 to be accessed in the sorted order which is low-order to high-order. Of course, the selection out circuitry 20 can be connected to access the buffered items in any order, that is from highest order to lowest order or in any other sequence. The important point to be noted is that the order is known.

Each output item from select circuitry 20 appears on the DSIS line 25 and is input to the select circuit 8. Circuit 8 converts the serial-by-bit buffered items on line 25 to a parallel by two bit format on the 2-bit DIB bus 27. From register 3, the sorted items can be transmitted to I/O unit 1 or otherwise utilized.

When the highest order one of the buffered items (for example, the seventh item with address 110 on bus 48) is addressed by bus 48, a control signal on line 94 enables the selector 86 to select the DSIS line 25 to load that highest order buffered item in the lower limit store 16 and to write all 1's into the stores 13. The highest order buffered item of the lowest order set after processing all new items in memory unit 2, therefore, becomes a new lower limit. With the new lower limit, the item addresses are preloaded to the initial sequence and the sort sequencing again proceeds as before processing all items from the memory unit 2.

Each time all new items from memory unit 2 have been processed, the buffered items remaining in the buffer stores 13 constitute a new lower order set. That new lower order set of buffered items is output through the data register 3 while the highest order one of the that set is loaded through selection circuit 86 into the lower limit store 16. At the same time, all of the buffer stores 13 are loaded with all 1's and the address registers 14 are preloaded to the initial sequence.

The processing continues filling buffer stores 13 with one lower order set after another. Whenever all of the new items from the memory unit 2 have been processed but all buffer stores 13 are not filled, the sorting sequence is complete and all items between the initial lower limit and the upper limit in memory unit 2 have been found and are in order from lowest order to highest order.

In FIG. 1, the master control 7 supplies control signals on bus 51 to the sort control 18. The signals include a 5MHz signal designated C5M. This signal is a master clock signal for the FIG. 1 apparatus.

A PLROP signal is supplied by control 7, as the result of an instruction in a program or by other convenient means, to designate to control 18 when it is time for sort unit 5 to perform an operation. Associated with the PLROP signal is a B2 bus from control 7 to control 18 which specifies, under program control or other convenient means, the type of operation to be performed by the FIG. 1 apparatus. The B2 bus includes QC1, QC2 and QC3 qualifying bits. The qualifying bits are used in conjunction with code fields which occur at times Q1F, Q2F and Q3F in the record items being sorted by the FIG. 1 apparatus. In addition to the qualifying bits, the B2 bus carries an INTC signal specifying that an initial scan of the record items is being commanded when a PLROP signal occurs. After a first search of all desired record items in the memory unit 2, the PLROP signal is again issued but the INTC signal is not.

When the PLROP signal is initially given to start the operation of the FIG. 1 apparatus, a succesive WCY signals are given from control 7 to control 18 to initiate write cycles for loading the lower limit and the upper limit stores bit by bit. The lower limit and upper limit stores are loaded with information from the DOB bus 26 of FIG. 1 at locations specified by an address bus. The address bus connects from control 7 to control 18 and includes locations BC0, A0, . . ., A15. Address bits A7 through A15 are used to address at different times the lower limit store, the upper limit store or other stores. Bits BC0, A0, . . ., A6 are used to uniquely address the 256 bit locations in the store specified by bits A7, . . ., A15. The address bits in control 7 are derived, for example, from an address counter or other means used in a conventional way for addressing the memory unit 2. Successive RCY signals are provided from control 7 to control 18 for reading information from the sort unit 5 in conjunction with the address bits.

In addition to the address bits, master control 7 provides a DTSR signal for identifying the memory unit address which includes disc, track, sector and record addresses of record items accessed from memory unit 2 and transmitted to the sort unit 5. The sort unit 5 utilizes the DTSR signal to store the memory unit address associated with each record item transmitted to the sort unit.

Master control 7 provides a DDAVL signal to control 18 for indicating when data is available from memory unit 2.

In summary, the master control 7 initially loads an upper limit, including search codes and search flags, and a lower limit in the upper limit and lower limit stores of FIG. 1 by energization of a WCY signal and by sequentially stepping through the binary address bits BC0, A0, . . ., A6 where bits for each store. After initialization, a PLROP signal specifies loading of a command into the sort control 18. The command includes qualifying bits QC1, QC2 and QC3, which specify which of the codes C1, C2 or C3 are to be considered in the sort process and includes an INTC signal which signals the first scan of the memory unit. A DDAVL signal is generated when data is being provided on the DOB bus 26 which is to be processed by the sort unit 5. During the sort process, new items from memory unit 2 are compared one at a time with buffered items temporarily retained in the sort unit. After each new item is compared, item addresses are transferred provided all control conditions are satisfied to update the sorted order of buffered items. After a complete search of the memory unit 2, a RCY signal and address bits from control 17 are input to the sort unit 5 to access the results of the sort and to provide a new lower limit. Thereafter, subsequent processing is carried out with the new lower limit under command of subsequent PLROP signals but without the INTC signal. After each scan of all record items in memory unit 2, the RCY signal is generated in conjunction with the address bits to obtain the results and update the lower limit. The control 7 includes means for detecting a predetermined condition (for example all 1's) in the output from sort unit 5. When the predetermined condition is detected, the processing is complete and the sort unit is ready for a new command.

RGU — SORT CONTROL — FIG. 2

Figure 2:
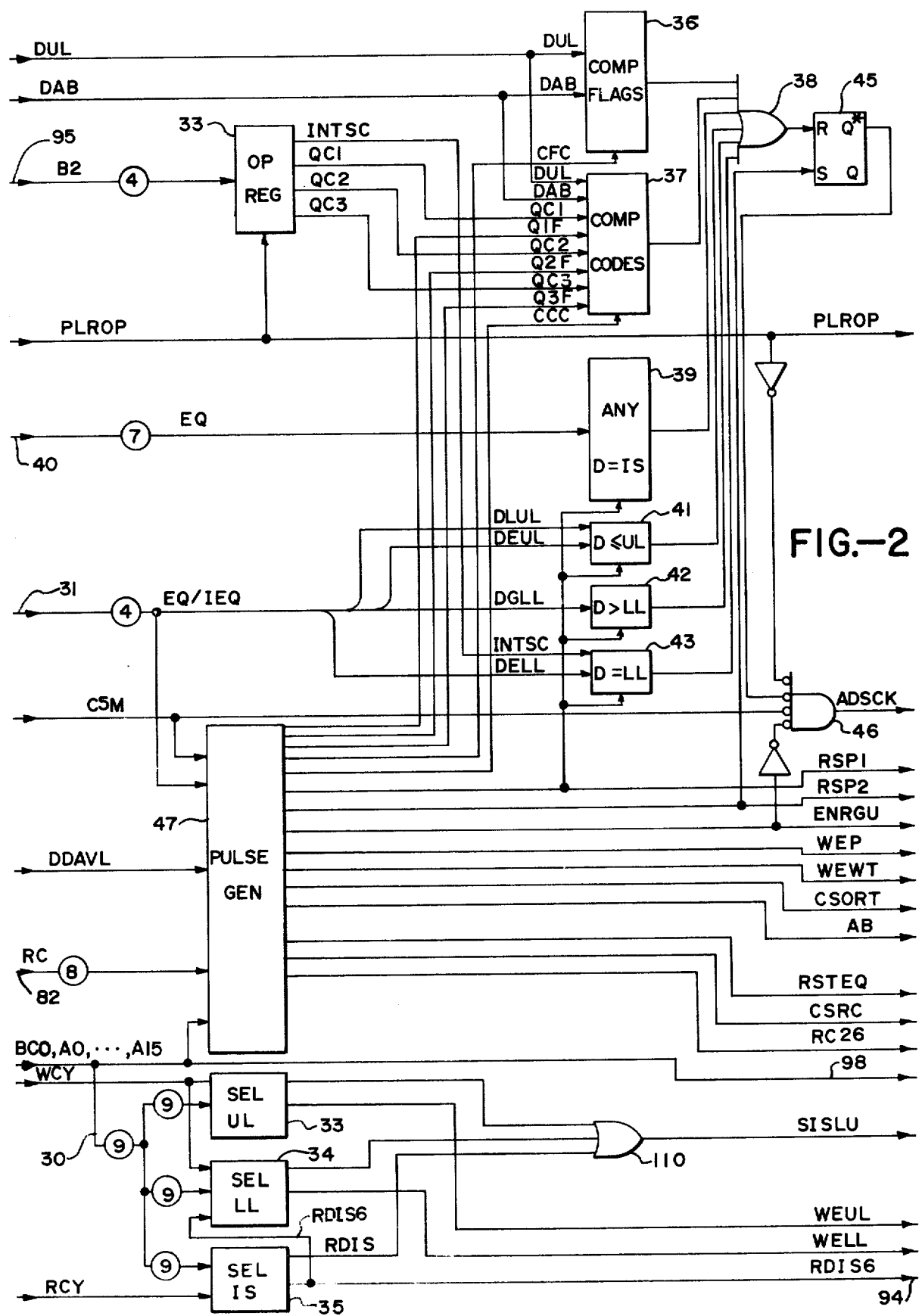
FIG. 2 depicts a further detailed block diagram of the RGU control within the sort apparatus of FIG. 1.

In FIG. 2, the sort control 18 of FIG. 1 is shown. In FIG. 1 control 18 receives control signals from the master control 7 as well as signals from the sort unit 5. Sort control 18 outputs a plurality of signals for controlling sort unit 5 in accordance with the sort method of the present invention.

In FIG. 2, 4 bits of the B2 bus 95 are input to the operation register(OPREG) 33. A command on the B2 bus is latched into register 33 by the PLROP signal from master control 7. Register 33 stores the signals INTSC, QC1, QC2 and QC3. The INTSC signal is stored as one bit to indicate when the sort unit 5 is to carry out the initial scan sequence of all record items in the memory unit 2. On the initial scan, an item matching the lower limit is not rejected. The signals QC1, QC2 and QC3 are each stored as one bit for including or excluding the C1, C2 and C3 fields from being considered in the sort unit operation and hence determine the type of report generated by the sort unit 5. The qualifying bits from register 33 are input to the code comparator 37. The INTSC signal from register 33 is input to the equality comparator 43.

The enable signals for the lower limit and upper limit stores of FIG. 1 are generated by selection circuits 33, 34 and 35. The upper limit selection circuit 33 receives the WCY signal and address bits A7 through A15 from control 7. Select circuit 33 generates a WEUL signal for enabling the upper limit store 17 of FIG. 1 whenever the WCY signal and a unique decode of the address bits A7 through A15 is present. Similarly the lower limit select circuit 34 produces the WELL signal to enable the lower limit store 16 in FIG. 1 whenever the WCY signal or an RDIS6 signal and a unique decode of the address bits A7 through A15 is present.

The select item sort circuit 35 is enabled in response to an RCY signal and a unique decode of the address bits A7 through A15 to provide a RDIS 6 signal to access the $N^{th}$ sorted item in the sort unit 5 and to provide the RDIS 6 input to select circuit 34 to produce the WELL signal.

In FIG. 2, OR110 receives a signal from each of the circuits 33, 34 and 35 to produce a signal SISLU, whenever the circuits are energized, where the SISLU signal controls the gating of data onto the DIB bus by circuit 8 in FIG. 1.

In FIG. 2, the DDAVL signal, indicating the availability of data from memory unit 2 of FIG. 1, is input to pulse generator 47. Pulse generator 47 also receives the C5M clock signal, the 4-bit equality/inequality(EQ-/IEQ) bus 31, the record counter (RC) 8-bit bus 82, and the address bus 98. Pulse generator 47 can be any well known pulse generating circuitry. For example, generator 47 can be a read-only memory which is addressed by the inputs described to produce a plurality of output signals. Alternatively, pulse generator 47 can be conventional gate circuits for generating output pulses in response to the input pulses. The details of the pulse generator 47 are defined in terms of the output pulses generated.

Figure 3:
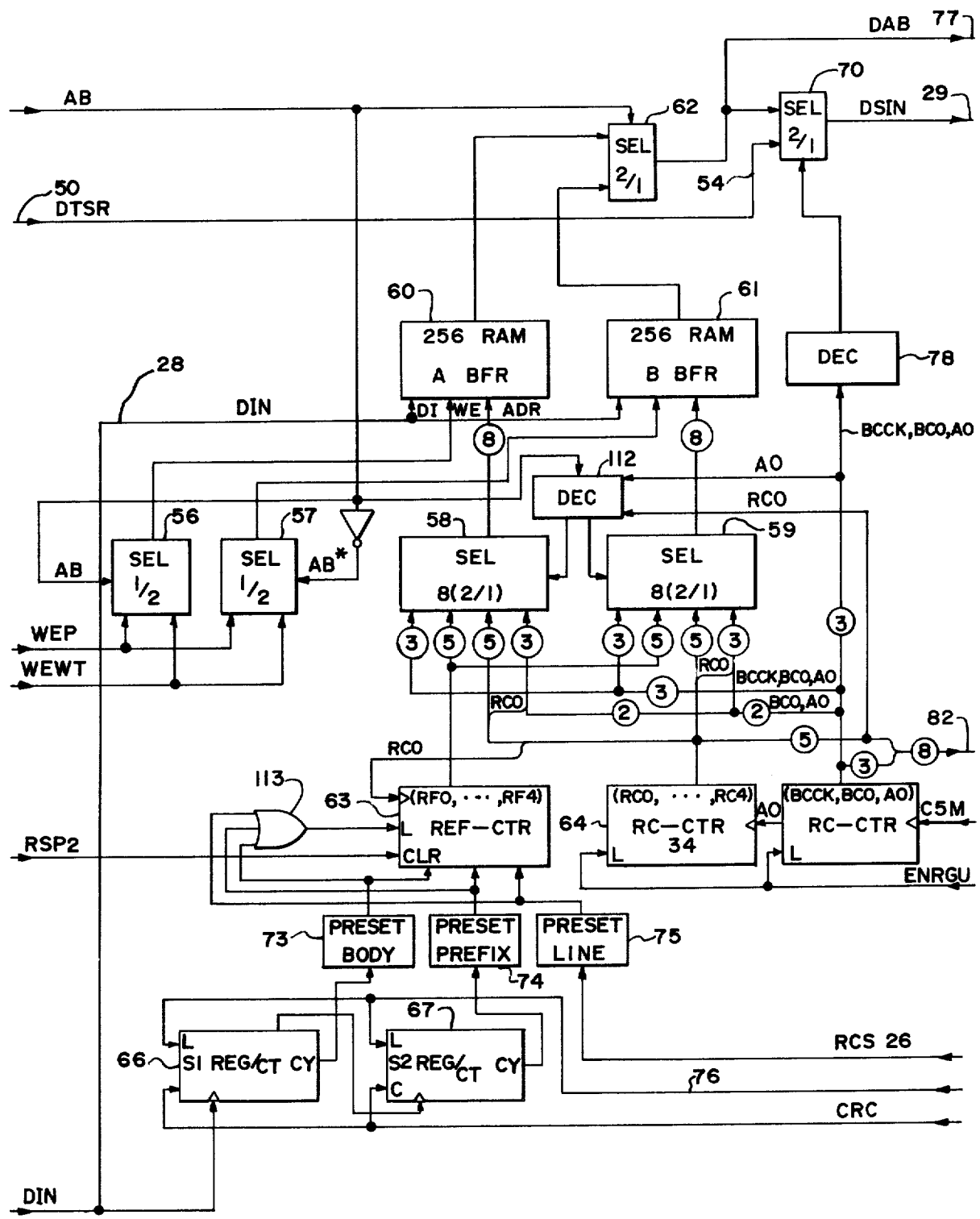
FIG. 3 depicts a schematic block diagram of the reformat circuitry within the sort apparatus of FIG. 1.

The basic timing of the pulse generator 47 is the 5MHz C5M signal which is also input to step the record counter(RCCTR) 64 in FIG. 3. Counter 64 includes 8 stages, which provide the parallel outputs BCCK, BC0, A0, RC0, . . ., RC4 as the 8-bit RC bus 82. The RC bus 82 is input to the pulse generator 47 so that generator 47 generates output pulses as a function of the count in the RC counter 64. The output pulses from generator 47 are also dependent upon the equality or inequality relationships from the EQ/IEQ bus 31 at a time when data is available as indicated by the DDAVL signal.

With the inputs to generator 47, the following outputs are poduced. The RSP1 signal output from generator 47 is produced each time a new record item of 17 bytes is to be transmitted to the sort unit 5. The RSP1 signal is present, for example, whenever the count on RC bus 82 is all 0's. The RSP2 signal is similarly generated once each time the RC counter of FIG. 3 is cycled, that is every 17 bytes of input data. The RSP2 signal is delayed a fixed time after the RSP1 signal. For example, RSP2 occurs two cycles of the C5M signal after RSP1.

The ENRGU signal is generated to signal the sort unit 5 that a sort is to be carried out in response to the DDAVL signal which indicates that data is available.

The WEWT and the WEP signals are provided to enable the A and B buffers 60 and 61 in FIG. 3. The WEWT signal is produced for connection to the one of the buffers 60 or 61 which is receiving DIN data under control of the reformat counter 63. The WEP signal is produced for writing 0's into the one of the buffers 60 or 61 which is reading out data under control of the RC counter 64. The 0's are written in as the data is read out.

The AB signal output from the pulse generator 47 switches states for each new record item received from memory unit 2. The AB signal functions to place the first record item in the A buffer and the second record item in the B buffer, the third record item in the A buffer and so on in an alternating fashion.

The RSTEQ signal is output from the generator 47 to restore equality in the comparators of the sort unit 5. The RSTEQ signal is produced in response to the RSP2 signal when a sort operation is in progress.

Generator 47 produces a CSRC signal for clearing the S1 and S2 counters in FIG. 3 at a time when the RC counter of FIG. 3 counts to its final count.

Generator 47 produces a RC26 signal which forces the reformat counter of FIG. 3 to its 29th count in response to a predetermined count of the record counter in FIG. 3. The predetermined count in the record counter is count 26.

Generator 47 produces a CSORT signal for bits 0 through 5 of each byte after RSP1. For bits 6 and 7, of each byte, no CSORT signal is generated.

In FIG. 2, the qualifying bits QC1, QC2 and QC3 from the operation register 33 are input to the code comparator 37 to designate whether or not the results of a code comparison should be utilized. Code comparator 37 also receives timing signals Q1F, Q2F and Q3F which are produced at predetermined counts of the RC counter to indicate when code signals are present. Those predetermined counts specify the predetermined locations within the reformatted record items which store item code fields. When each record item is addressed, the item code fields appear on the DAB bus at times Q1F, Q2F and Q3F. In a similar manner, search code fields, stored in the upper limit store, appear on the DUL bus at Q1F, Q2F and Q3F times. The search codes on the DUL bus are compared with the item codes on the DAB bus, at times determined by the Q1F, Q2F and Q3F signals, provided the qualifying bits QC1, QC2 or QC3 have been set, respectively, in the operation register. As a specific example, each bit from the upper limit store appears on line DUL at the samee time that a corresponding record item bit appears on line DAB. The bits on lines DAB and DUL are compared, for the C1 code, only when the Q1F signal occurs and then only provided that the QC1 signal is set. The code comparator 37 is typically implemented with conventional logic gates which do not provide an output whenever QC1, Q1F, DAB, DUL and CCC are all present but otherwise do. If the output does not exist, then OR gate 38 does not produce an output and therefore latch 45 is not reset. If an output does occur, however, the output is propagated through gate 38 and resets latch 45. Whenever, latch 45 is reset, the Q* output from latch 45 inhibits generation of the ADSCK pulses from gate 46 and hence prevents transfers of item addresses.

In FIG. 2, the flag comparator 36 also compares bits on the DUL and DAB lines but the comparison is at a time specified by a CFC signal which occurs at a predetermined count of the RC counter. Comparator 36 provides an output whenever an item flag bit is not set in the record item on line DAB at a time when there is a search flag bit set in the upper limit item on the DUL line and when a CFC signal is output from the pulse generator 47. An output from comparator 36 is transmitted through OR gate 38 to reset latch 45 and to inhibit the ADSCK pulses from gate 46.

In FIG. 2, detector 39 detects the condition when the new item on bus 29 equals any item stored in the item sort buffer stores 13. This indication is presented on bus 40 for each of the stores 13 in the system. Detector 39, therefore, is typically an OR gate having a gated output at the RSP1 time established by the generator 47. The output from detector 39 is also input to the OR gate 38. If any equality is present, latch 45 is reset and inhibits the ADSCK shift pulses.

The control circuitry of FIG. 2 additionally includes three detectors 41, 42 and 43. Detector 41 detects the condition that the new item on the DSIN bus 29 is greater than the item in the upper limit store 17 at RSP1 time. The detector 42 senses the condition where the new data is less than the lower limit (DGLL) signal at RSP1 time.

The detector 43 detects when the new data on bus 29 is equal to the lower limit during scans other than the initial scan at RSP1 time. Any output from the detectors 41, 42 and 43 is input to the OR gate 38 to reset latch 45 thereby inhibiting shift pulses from being generated by gate 46. Latch 45 is set by each RSP2 signal in preparation for detecting reset pulses from OR gate 38.

REFORMAT APPARATUS — FIG. 3

The circuitry of FIG. 3 receives each record item as 17 bytes on the DIN line 28 with the format of the previous CHART I and reformats each item with the 32-byte format of CHART IIA hereinafter. The reformatted item is stored in one of two buffer stores, the A buffer (ABFR) 60 or the B buffer (BBFR) 61. The input data from DIN line 28 is input to the buffers 60 and 61 to store data, flags and codes and is input to the field boundary register 66 to store the pointer byte.

Buffers 60 and 61 are conventional 256-bit random access memories which store data input from DIN line 28 on data in (DI) inputs when enabled by write enable (WE) inputs from selection circuits 56 and 57 at addresses specified by address (ADR) inputs from selection circuits 58 and 59. The selection circuits 56, 57, 58 and 59 are in turn controlled by AB signals from the control unit of FIG. 2. Selection gates 58 and 59 select the eight address bits from two locations. One location is from the record (RC) counter 64 which provides five high-order bits (RCO, . . . , RC4) and three low-order bits (BCCK, BC0 and A0). The other location is from the reformat counter (REF CTR) 63 which provides five high-order bits (RF0, . . . , RF4). A corresponding three low-order bits (BCCK, A0 and RC0 are also provided from the RC counter 64 for use with bits RC0, . . . , RF4. The high-order bits from the two counters 63 and 64 and the associated low-order bits are alternately connected to the A buffer 60 and the B buffer 61 to alternately reverse the roles of the buffers.

Counter 63 is utilized for loading one of the two buffers 60 and 61 while counter 64 is concurrently utilized for unloading the other of the buffers 60 and 61. The buffers 60 and 61 receive write enable pulses, WEWT and WEP, which are applied to one or the other of the buffers under control of the pulses AB and AB* from the pulse generating circuit 47 of FIG. 2. When the AB signal is 1, selection circuit 56 connects the enable WEWT signal to the A buffer 60 for writing the data from DIN line 28. Simultaneously, the AB* signal is 0 and connects the WEP signal to the B buffer 61 for storing a 0 after the data has been readout from buffer 61. When the AB and AB* signals are reversed, the connections to and the roles of the AB buffers are reversed.

For 6 out of 8 bits of each byte, the AB1 signal also connects the eight record (RC) counter address bits to the B buffer 61 while the AB*0 signal connects the five reformat (REF) counter address bits and its associated three lower order address bits to the A buffer 60. When the AB and AB* signals are inverted, (AB=0; AB*=1) the REF counter 63 and the associated lower order bits address the B buffer 61 while the RC counter 64 addresses the A buffer 60 for 6 out of 8 bits.

For 2 bits (BIT 6 and BIT 7) out of 8 bits for each byte, decoder 112 in FIG. 3 functions to switch the addressing so that the RC counter addresses both the A and B buffers. The decoder 112 decodes the RC0 and A0 signals from the RC counter and detects the 11 condition of those bits which condition only occurs for BIT 6 and BIT 7 of each byte. Whenever RC0 and A0 are both 1's, decoder 112 forces both select circuits 58 and 59 to select the RC counter. When A0 and RC0 are not both 1's, decoder 112 inputs the AB* signal to circuit 58 and the AB signal to circuit 59. When AB is 1 circuit 58 connects counter 63 to buffer 60 while RC counter 64 is selected by circuit 69 for connection to buffer 61 except during BIT 6 and BIT 7. A reversal of AB reverses the connections.

When the 17 bytes of data from a new record are input on the DIN bus 28 for storing into one of the buffers 60 or 61, the REF counter 64 is preset to a count and/or stepped in count a total of 16 times by the RC0 signal from the RC counter 64. The counter 63 is stepped by RC0 except when OR gate 113 switches the counter 63 to a parallel load mode which allows RC0 to store a predetermined count from one of the circuits 73, 74 and 75. The circuits 73, 74 and 75 each causes the REF counter 63 to jump to predetermined different counts which identify the start of the body field, the prefix field, and the line field, respectively. The record item on the DIN bus 28 appears with the fields in the order of suffix field, body field, prefix field and line field. The first character of the suffix field always appears at address 0 in the A or B buffers 60 and 61 which corresponds to a 0 count in the REF counter 63. Similarly, the first character of the body field is always written at address 9 in the buffers 60 and 61 which corresponds to a 9-count in REF counter 63. The first character of the pefix field is always written at location 20 in the buffers 60 and 61 which corresponds to a 20-count in REF counter 63. Finally, the first character of the line field is always stored at address 29 which corresponds to a 29-count in REF counter 63. The present body circuit 73, the preset prefix circuit 74 and the preset line circuit 75 each comprise means for advancing counter 63 to a 9-count, a 20-count, and 29-count, respectively. The circuits 73 through 75 are, therefore, conventional wiring connections or other means which load the indicated counts into REF counter 63 upon appropriate control signals. The control signal for the body circuit 73 is derived from the carry-out of the S1 counter 56. The control signal for the prefix circuit 74 is derived from the carry-out of the S2 counter 67. The control signal for the line circuit 75 is RCS 26 which is derived from the decoder 69. Decoder 69 decodes the $26^{th}$ byte count of the RC counter 64.

The S1 counter 66 and S2 counter 67 are field boundary identifying counters which determine when the REF counter 63 is jumped to the count which specifies the starting addresses for the body and the prefix, respectively.

Counters 66 and 67 each store four bits which are derived, at the start of each 17-byte record item, from the first byte. The first byte of each record item is a field boundary identifier byte which identifies the field boundaries in the following 16 data bytes 4 bits of which identify the start of the body field and 4 bits of which identify the start of the prefix field. The 8 bits of the first field boundary byte are shifted into the S1 and S2 counters. 4 bits are stored in the S2 counter 67 and 4 bits are stored in the S2 counter 66. After the first byte has been shifted into the S1 and S2 counters 66 and 67, decoder 69 via line 76 switches the register counters 66 and 67 from the parallel load mode to the count mode. Thereafter, counters 66 and 67 are incremented by the signal CSRC from the pulse generator circuit 47 of FIG. 2 for each byte of data which is gated onto the DIN bus 28 and stored in the A or B buffers 60 and 61.

Whenever the number of bytes stored in the A or B buffers equals the count in the S1 counter 66, the complete suffix field has been stored and counter 66 provides a carry-out signal. That carry-out signal is input to the preset circuit 73 forcing the REF counter 63 to a count of 9. Similarly, after the number of bytes stored equals the count in S2 counter 67, the complete body field has been stored and a carry-out from counter 67 enables the prefix circuit 74 forcing counter 63 to a count of 20. Finally, when the RC counter 64 reaches a count of 26 that count is recognized by decoder 69 and enables the line circuit 75 to force counter 63 to a count of 29.

While the REF counter 63 is addressing one of the buffers 60 or 61 to receive incoming items from memory unit 2, the RC counter 64 is addressing the other to read out data to the selection circuit 62. Selection circuit 62 selects data from either the A buffer 60 or the B buffer 61 for output on the data bus (DAB) 77 with a format shown hereinafter in CHART IIA. Circuit 62 is selected by the AB signal to select that one of the buffers 60 or 61 which is being addressed by the RC counter 64. Selection between the output data on the DAB line 77 and the memory unit address on the DTSR line occurs in selector 70 to provide the data on the DSIN line 29 in the format of CHART IIB hereinafter. The DAB line is selected for bits 0, . . . , 6 and the DTSR line is selected for bit 7 of each byte. The DSIN line 29 transmits character and address information to the buffer stores 13 and comparators 9 of sort unit 5 of FIG. 1. The DAB line 77 connects flag and code information to the comparators of FIG. 2.

The memory unit address which is inserted a bit at a time into the eighth bit of each byte is obtained from the DTSR line 50 from the master control 7 of FIG. 1. Line 50 typically connects from the address register (not shown) which is part of and is used to address memory unit 2. Decoder 78 decodes the count in the RC counter 64 to provide an output on the $8^{th}$ bit of each byte after the first. Each $8^{th}$ bit of each byte is detected by decoder 78 to switch the output from selection circuit 70 from the DAB line to the DTSR line for one bit.

SORT UNIT — FIG. 4

Figure 4:
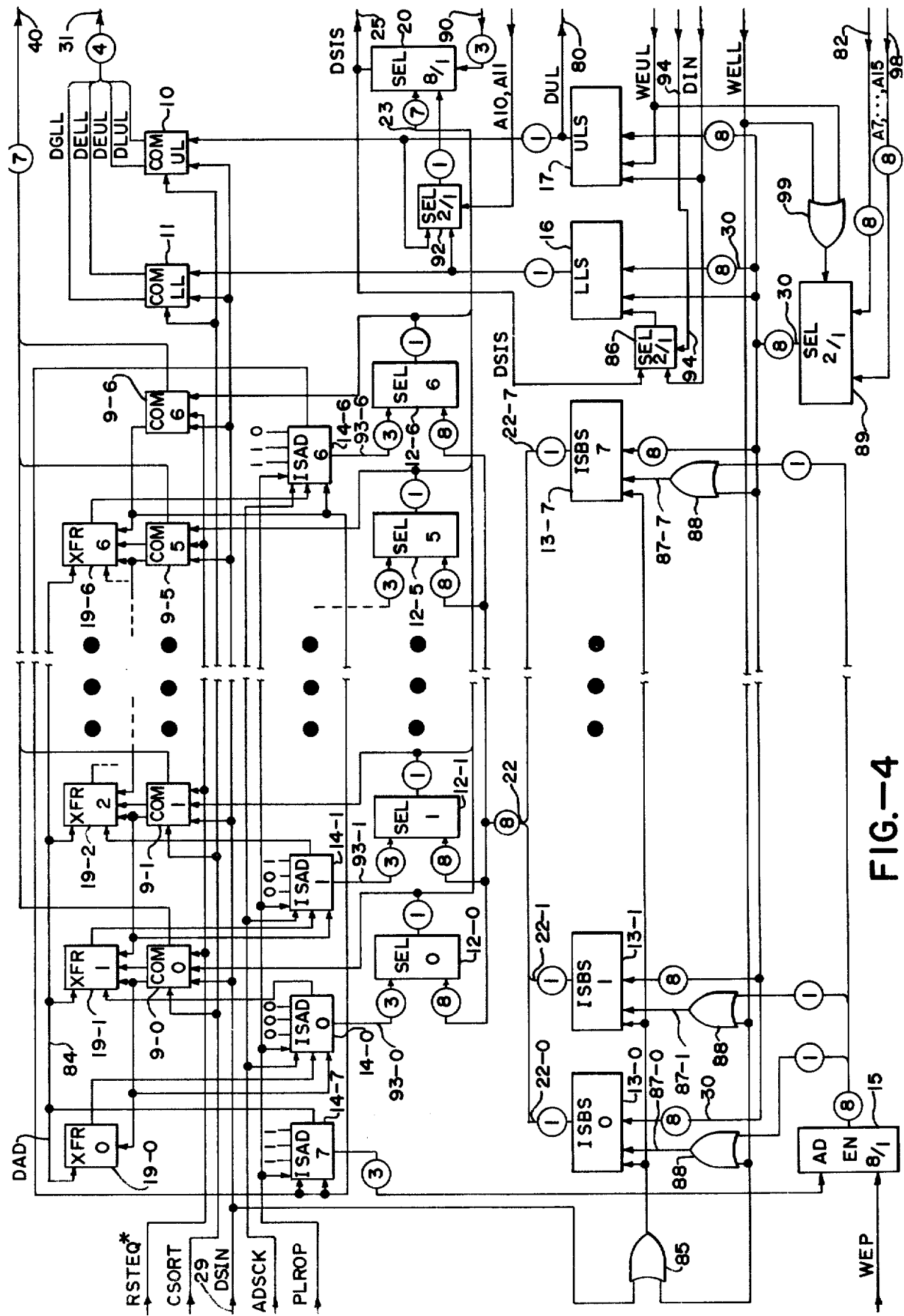
FIG. 4 depicts a block diagram of the sort unit within the apparatus of FIG. 1.

In FIG. 4, the sort unit 5 of FIG. 1 is shown in greater detail. The eight item sort buffer stores 13-0 through 13-7 correspond to the (N+1) stores 13 in FIG. 1. In the FIG. 4 embodiment of FIG. 1, N is equal to 7. Each of the stores 13 of FIG. 4 is typically a random access memory store storing 256 bits which corresponds to 32 bytes of data. Each of the stores 13 stores one record item and associated memory unit address DTSR (disc, track, sector, record) used in conjunction with the sorting procedure. Each of the stores 13 is addressed by the 8-bit address bus 30. The stores 13 are enabled by the enable lines 80-0 through 80-7 which are output from the OR gates 88. Gate 85 and all gates 88 are energized in parallel by the write enable lower limit (WELL) signal derived from the control 18 of FIG. 2. The stores 13 are write enabled by the WELL signal in order to write all 1's into the stores 13 each time a lower limit is written into store 16. At other times, the enable lines 87 are write enabled one at a time by the address enable circuit 15 to receive the data on the DSIN line from the A or B buffer. Circuit 15 is a decoder which decodes the 3-bit address from the item sort address (ISAD) register 14-7 to select one of eight output lines of address enable circuit 15 as inputs to the OR gates 88. Whenever one of the stores 13 is write enabled by a signal on one of the lines 87-0 through 87-7 an address on address bus 30 causes an output data bit to appear on the appropriate one of the output lines 22-0 through 22-7. Incoming data on the DSIN line is presented on the input to all stores 13 from OR gate 85 and is written into the addressed location in the enabled one of the stores 13.

The OR gate 85 receives its input information either from the DSIN line 29 from the reformat circuit of FIG. 3 or from the WELL enable line from the control circuit of FIG. 2. The address enable circuit 15 functions to decode the three item sort address bits from register 14-7 at a time when the enable signal WEP, derived from the pulse generator of FIG. 2, is present.

The 1-bit serial data outputs from each of the buffer stores 13 collectively form the 8-bit bus 22 which connects as an input to each of the select circuits 12-1 through 12-6. The seven select circuits 12 in FIG. 4 correspond to the N select circuits 12 in FIG. 1. Each select circuit 12 functions to select one of the eight inputs and provides a 1-bit output which connects to a corresponding one of the comparators 9-0 through 9-6. Also the seven outputs from the select circuits 12 together form the 7-bit bus 23 input to the select circuit 20. Each of the selection circuits 12-0 through 12-6 in FIG. 4 is addressed by the contents of a corresponding one of the item sort address (ISAD) registers 14-0 through 14-6, respectively.

The eight registers 14-0 through 14-7 correspond to the (N+1) registers 14 in FIG. 1. Each of the ISAD registers 14 stores 3 bits employed for addressing the connected one of the selection circuits 12. Registers 14-0 through 14-7 have fixed inputs 000, 001, ..., 111, respectively, which are initially loaded at the start of a sort operation upon the command of the PLROP input signal. At other times, addresses are shifted from other ISAD registers into the registers 14-0 through 14-6 by transfer (XFR) circuits 19-0 through 19-6, respectively. The shifting occurs in response to address shift clock (ADSCK) pulses. The ISAD registers 14-0 through 14-6 are enabled by the "less than" output of the corresponding comparators 9-0 through 9-6, respectively.

The ISAD register 14-7 receives its input directly from the output of ISAD register 14-6. The output from register 14-7 is connected in parallel to all of the XFR circuits 19-0 through 19-6. The outputs from each of the other registers 14-0 through 14-5 are input to the XFR circuits 19-1 through 19-6, respectively.

The seven transfer (XFR) circuits 19-0 through 19-6 in FIG. 4 corresponds to the N transfer circuits 19 in FIG. 1. The transfer circuits 19-0 through 19-6 function to transfer an item sort address from one of the ISAD registers 14 to the next adjacent one of the registers 14 from low-order to high-order. The $i^{th}$ transfer circuit transfers an item address from the $(i-1)^{th}$ address register into the $i^{th}$ address register for all values of i between 1 and (N-1). The $0^{th}$ transfer circuit 19-0 transfers an item address from the $(N-1)^{th}$ address register 14-6 to the $N^{th}$ address register 147. The transfers are made only on certain conditions. Each of the XFR circuits also receives an input on DAD line 84 which is output from ISAD register 14-7. The DAD line 84 allows the ISAD address of a new item to be stored in any one of the registers 14. The conditions of transfer are determined by the comparators 9-0 through 9-6. Each $i^{th}$ transfer circuit of the transfer circuits 19-1 through 19-6 receives a "greater than" or "less than" input from the $(i-1)^{th}$ comparator for i equal to 1, ..., (N-1) and a "less than" input from the $i^{th}$ comparator for i equal to 0, ..., (N-1). For example, comparator 9-0 provides a "greater than" and "less than" input to XFR circuit 19-1. Transfer circuit 19-1 also receives a "less than" input from comparator 9-1. Transfer circuit 19-0 receives only the "less than" indication from the comparator 9-0.

The conditions for transfer are that the $i^{th}$ transfer circuit transfers an item address from the $(i-1)^{th}$ address register into the $i^{th}$ address register when the $i^{th}$ comparator produces a "less than" signal; the $i^{th}$ transfer circuit transfers an item address from the $N^{th}$ address register into the $i^{th}$ address register when both the $(i-1)^{th}$ comparator produces a "greater than" signal and the $i^{th}$ comparator produces a "less than" signal for all values of i equal to 1, ..., (N-1); the $0^{th}$ transfer circuit transfers an item address from the $N^{th}$ address register into the $0^{th}$ address register when the $0^{th}$ comparator produces a "less than" signal; and the $(N-1)^{th}$ address register stores the $(N-1)^{th}$ item address in the $N^{th}$ address register when the $(N-1)^{th}$ comparator produces a "less than" signal.

The seven comparators 9-0 through 9-6 correspond to the N comparators 9 in FIG. 1. The comparators 9-0 through 9-6 each compare the new record item input on DSIN line 29 with a different corresponding record item stored in the connected one of the buffer stores 13. The particular one of the stores 13 which is connected to a particular one of the comparators 9 is determined by the selection circuits 12. Each of the circuits 12 is in turn controlled by the addresses in the connected one of the registers 14. The order of connecting the eight buffer stores 13-0 through 13-7 to the seven comparators 9-0 through 9-6 is determined, therefore, by the item sort addresses in the seven registers 14-0 through 14-6. By changing the addresses in the registers 14-0 through 14-6, the order of connection of the buffer stores 13 to the comparators 9 is changed. Each of the comparators 9-0 through 9-6 also receives a new record item input from the DSIN line 29. Each of the comparators 9 compare the new item on line 29 with a buffered item from the buffer stores 13 to determine the "greater than", "equal to" or "less than" equality relationships. One buffered item from each of seven of the eight buffer stores 13 is utilized for comparison in the seven comparators. The eighth buffer store, the one not connected to a comparator, is loaded with the new record item on the DSIN line 29. The particular one of the buffer stores which receives the new record item from DSIN line 29 is specified by the address in the ISAD register 14-7. The equality relationship determined by the comparators 9 is stored after each bit comparison for bits 0 through 5 by the CSORT signal. The flag, code, equality and limit relationships are stored as previously described in connection with FIG. 2. The stored relationships remaining after all 16 bytes have been compared for a record item determined the transfers made by the transfer circuits. Before making a new sort, for a new record item, the stored equality relationships of the previous sort are removed by a RSTEQ* signal.

In FIG. 4, the lower limit store 16 and the upper limit store 17 are identical to the like-numbered devices discussed in connection with FIG. 1. Stores 16 and 17 are addressed by the bus 30 in the same manner as the buffer stores 13. The lower limit store 16 is enabled by the WELL signal and stores data received from the selection circuit 86. Selection circuit 86 functions to input the initial lower limit via the DIN line 28 or to input the highest order one of the sorted buffered items within the buffer stores 13 before processing any of the record items in the memory unit 2 of FIG. 1. The highest order record item in the buffer stores 13 is loaded into the lower limit store 16 via the selection circuitry 20 and the selection circuitry 86. Selection circuitry 20 selects the output from each of the selection circuits 12-0 through 12-6 one at a time from the 8-bit bus 23. Selection circuit 20 selects the outputs in response to the 3-bit control input on bus 90 which is address bits A8, A9 and A10 derived from the master control 7. The buffer store 13 having the highest order one of the seven sorted items is selected by one of the address registers 14 and is available on DSIS line 25 for selection by circuit 86.

Selection circuit 20 typically addresses the selection circuits 12-0 through 12-6 in order. The output from selection circuit 12-0 is the lowest order address and the output from selection circuit 12-6 is the highest order address. The output from selection circuit 12-6 when selected by selection circuit 20 is output on the data in bus (DIB) and is also loaded via the DSIS line through the selection gate 86 to the lower limit register 16. Selection circuit 12-6 in a preferred embodiment is addressed by 3-bit bus 90 with bit values 110. Decoder 91 in FIG. 2, therefore, is set to detect the 110 code via enabling the selection circuitry 86 ia line 94 to select the DSIS line and load the output from the selection circuit 12-6 into the lower limit store 16. Buffer stores 13 and lower limit store 16 are simultaneously and sequentially addressed by the addresses on address bus 30.

In FIG. 4, the upper limit store 17 includes addressable locations for 256 bits of data. The upper limit store 17 is addressed by address bus 30 when enabled by the write enable upper limit signal WEUL. The WEUL signal is energized prior to the commencement of the sort operation for loading an upper limit into register 17 via the DIN line 28. Both the lower limit store 16 and the upper limit store 17 connect through a selection circuit 92 to form the eighth input to selection circuit 20. Address bits A10 and A11 are employed to select circuit 92 for determining when either the upper limit or the lower limit is to be read out through selection circuit 20 to be placed on the DIB line 27.

The sort unit of FIG. 4 also includes the lower limit comparator 10 and the upper limit comparator 11 identical to the like-numbered units in FIG. 1. The lower limit comparator 10 receives the new item on the DSIN line 29 for comparison with the contents of the lower limit store 16. Similarly, the upper limit comparator 11 receives the new item on the DSIN line 29 for comparison with the upper limit in the upper limit store 17. The output from the lower limit store 10 is a "data greater than the lower limit" (DGLL) signal and a "data equal to the lower limit" (DELL) signal. The upper limit comparator provides a "data equal to the upper limit" (DEUL) signal and a "data less than the upper limit" (DLUL) signal. The four signals DGLL, DELL, DEUL and DLUL together comprise the 4-bit equality bus 31.

SORT UNIT DETAIL — FIG. 5

Figure 5:
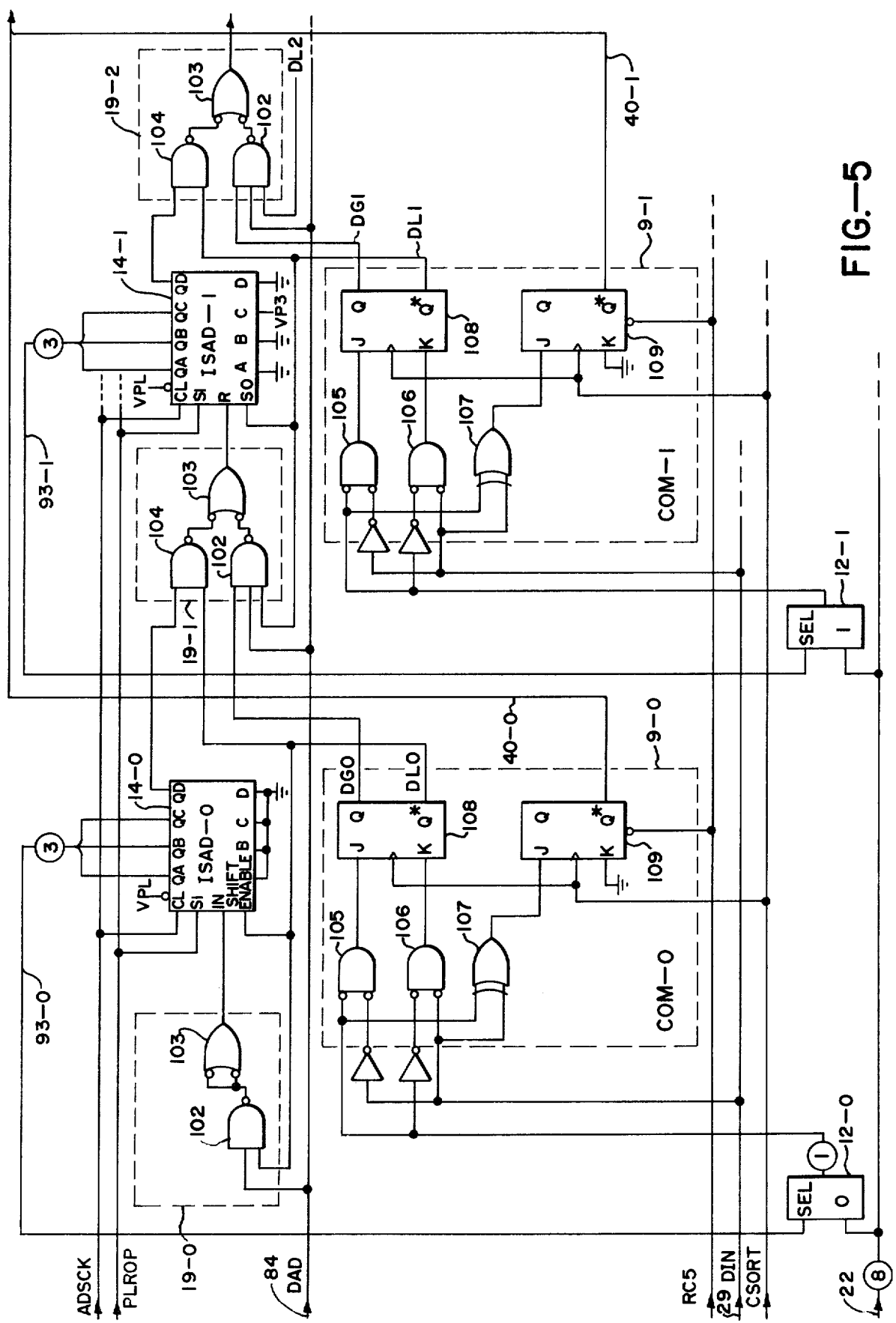
FIG. 5 depicts further details of a typical portion of the sort unit of FIG. 4.

In FIG. 5, a portion of the sort unit of FIG. 4 is shown. The transfer circuit 19-0 includes a NAND gate 102 which receives the data address (DAD) line 84 and the "data less than" (DL0) line from the 0 comparator 9-0. The output from gate 102 is input through the NAND gate 103 which functions as an inverter in circuit 19-0. The output from gate 103 is input to the data input of register 14-0. Circuit 19-0 transfers the data on line 84 into register 14-0 whenever the DL0 line is energized.

The A, B, C and D inputs of register 14-0 are all tied to 0 as indicated by the ground connections for parallel loading all 0's. The all 0's are loaded into register 14-0 in response to a PLROP signal. The register 14-0 outputs QA, QB and QC form the 3-bit bus 93-0. Bus 93-0 connects the item sort address stored in register 14-0 to the selection circuit 12-0. Register 14-0 is clocked by the ADSCK line to transfer its contents out over its QD output. The QD output from register 14-0 is the data input to the NAND gate 104 of the transfer circuit 19-1. Circuit 19-1 functions, when enabled by the "less than" signal from circuit 9-0, to transfer the item sort address from register 14-0 to register 14-1.

The XFR circuit 19-1 receives the QD output from register 14-0 provides data through NAND gate 104 when gate 104 is enabled by the "data less than" (DL0 line from comparator 9-0. Circuit 19-1 also includes the NAND gate 102 for transferring the DAD data from the QD output of register 14-7 into register 14-1 when enabled by the "data greater than" (DGO) line from comparator 9-0 and the "data less than" (DG1) line from comparator 9-1. Gate 103 receives the outputs from gates 102 and 104 and in turn provides a data input to register 14-1.

Transfer circuit 19-1 is typical of all of the transfer circuits 19-1 through 19-6 in FIG. 4. Similarly, the register 14-0 is typical of all of the registers 14-0 through 14-7 in FIG. 4 except that each register is loaded by the PLROP signal with a different input. For example, register 14-1 has its A, B and D inputs 0 and its C input 1, so that a PLROP signal loads the item address 001 into register 14-1. Comparator 9-0 is typical of all of the comparators 9-0 through 9-6 and also of the comparators 10 and 11 in FIG. 4.

In FIG. 5, comparator 9-0 includes the NAND gates 105 and 106 which each receive two data inputs and each provide a comparison output which connects to the J and K inputs, respectively, of flip-flop 108. Gate 105 receives one data input from a buffer store via selection circuit 12-0 and an inverted data input from the DSIN line 29. The gate 106 receives one data input from the DSIN line 29 in the inverted input from a buffer store via the selection circuit 12-0. Gate 105 functions to detect whenever there is a 0 bit in the item from selection circuit 12-0 while there is simultaneously a 1 bit in the item from the DSIN line. Gate 106 performs the inverse function of gate 105. Gate 105 detects whenever there is a 1 bit from circuit 12-0 and a 0 bit from the DSIN line. Each time data bits are input to gates 105 and 106, a CSORT signal clocks flip-flop 108 to store the results of the comparison. If a 1 is present on the DISN line when a 0 is present from circuit 12-0, the output of gate 105 is active and the Q otput of flip-flop 108 is set to a 1. If alternatively a 1 is present, the 12-0 circuit output when there is a 0 present on the DSIN line, gate 106 provides a 1 output setting the Q* output of flip-flop 108 to a 1. If the bits from DSIN line 29 and from circuit 12-0 are both 1's or are both 0's, then neither gate 105 or 106 has a 1 output and flip-flop 108 is not changed by the CSORT signal.

The order of bits for the new item from line 29 and the order of bits for the buffered item from selection circuit 12-0 appear from low-order to high-order. Because of the low-order to high-order processing, the last state at which the flip-flop 108 is left after processing all bits of a record item indicates the correct equality determination. If the new item is greater than the buffered item 108Q is 1 and if the new item is less than the buffered item, 108Q* is 1. The greater than less than determination is valid, however, only if the new item and the buffered item are not in fact equal.

The equal determination is made by the EXCLUSIVE-OR circuit 107 which senses the new item and the buffered item bits directly from the DSIN line 29 and selection circuit 12-0. The output from gate 107 is connected to the J input of flip-flop 109. If flip-flop 109 is not set with a 1 on 109J at any time during the sorting operation of a record item, then flip-flop 109 remains set with a 1 on its Q* output indicating the equality of the new item and the buffered item.

If, the DEQ0 line on the Q* output remains 1, it provides the 40-0 input on bus 40 to the detector 39 of FIG. 2. In FIG. 2, the detection of any equality signal DEQ0, DEQ1, . . . , DEQ6 from bus 40 inhibits the presentation of clock pulses on line ADSCK so that the "greater than" or "less than" determination of flip-flop 108 becomes ignored. If any pair of corresponding bits in the new item and the buffered item are unequal gate 107 provides an output to set flip-flop 109 with a 0 on its Q* output. If bus 40 has all 0's, then the ADSCK clock pulses will be applied to transfer item sort addresses unless other inputs to OR gate 38 of FIG. 2 inhibit ADSSCK pulses.

REFORMAT OPERATION

The reformat apparatus of FIG. 3 loads record items having the format shown in CHART I as previously described into either the A or B buffers 60 or 61 of FIG. 3. In loading the record items from the DIN line into a buffer, the apparatus of FIG. 3 justifies the CHART I information along field boundaries using the boundary information of the first byte, BYTE 00. One typically justified format appears in the following CHART IIA, which is the format of information on DAB line 77 of FIG. 2. In CHART IIA, a typical example has been assumed for explanation where the suffix is three characters (D0, D1, D2), the body is five characters (D3, D4, D5, D6, D7), the prefix is five characters (D8, D9, D10, D11, D12) and the line is three characters (D13, D14, D15).

During the first eight counts of the RC counter, the 4-bit S1 field is shifted into counter 66 and the 4-bit S2 field is shifted through counter 66 to counter 67. Counter 66, therefore, receives the 4 bits BIT 0, . . . , BIT 3 of BYTE 00 in CHART I and counter 67 receives the 4 bits BIT 4, . . . BIT 7 of BYTE 00 in CHART I. The function of the S1 field is to store a count which identifies the boundary between the suffix and body and the function of the S2 field is to store a count which identifies the boundary between the body and the prefix. The suffix by design choice always begins at BYTE 0. In the chosen example, the body commences at BYTE 3 and the prefix commences at BYTE 8. Referring to CHART I, the 6-bit D0 field in BYTE 0 defines the first alphameric character of the suffix. The 6-bit D1 field of BYTE 1 defines the second alphameric character of the suffix and the 6-bit D2 field of BYTE 2 defines the third and final character of the suffix. In CHART I, the 6-bit D3, D4, D5, D6 and D7 fields in BYTES 3, 4, 5, 6 and 7 comprise the five characters of the body. The 6-bit D8, D9, D10, D11 and D12 fields comprise the five characters of the prefix. The 6-bit D13, D14 and D15 fields define the three characters of the line.

While the RC counter of FIG. 3 has stepped through eight counts for loading BYTE 00 into the S1 and S2 counters, the reformat counter 63 is cleared to 00000. The AB signal from generator 47 of FIG. 2 selects the reformat counter 63 to byte address the A buffer 60 while the low-order RC counter 64-4 bits BC0, A0 and A1 bit address buffer 60. With counter 63 in the 0 count, BYTE 0 in the A buffer 60 is addressed. The low-order RC counter 64-4 is then stepped six times to address BITS 0 through 5 of CHART I and load the 6-bit D0 field into BYTE 0 of the buffer. Thereafter for bits BIT 6 and BIT 7, the byte addressing of buffer A is switched from the reformat counter 63 to the high-order RC counter 64-6 by the AB signal. The RC counter 64-6 has been stepped by the A0 pulses twice as many counts as the reformat counter 63 so that counter 64-6 address BYTE 1 in the A buffer. Since as indicated in CHART I, BIT 6 of BYTE 0 is blank, there is nothing to store in the A buffer (as shown by CHART IIA) for this bit. BIT 7 of BYTE 0 in CHART I contains the 1-bit F0 field. The RC counter 64-6 addresses A buffer 60 to store F0 in BIT 7 of BYTE 1. the byte addressing is switched back to the reformat counter from the RC counter after the sixth and seventh bits of every byte by the AB signal.

After BIT 7 of BYTE 0 from CHART I is stored in BIT 7 of BYTE 1 of CHART IIA, the reformat counter is stepped to a 1 count to address BYTE 1, the 6 bits D1 are then loaded into the A buffer by operation of the low-order RC counter 64-4. When all six D1 bits have been loaded into BYTE 1, as indicated in CHART IIA, the AB signal switches the byte addressing from the reformat counter 63 to the high-order RC counter 64-6. The RC counter 64-6 stores F1 in BIT 7 of BYTE 3 as shown in CHART II. Thereafter, the byte addressing is switched back to counter 63 and an RC0 pulse increments the counter 63 to a 2-count for loading the 6-bit D2 character of the suffix into the A buffer. With the reformat counter at 2, the low-order RC counter 64-4 loads the 6 bits of D2 into BYTE 2 as shown in CHART IIA. Thereafter, the byte addressing is switched to the high-order RC counter. The C1 in BIT 6 of BYTE 2 in CHART I is loaded into BIT 6 of BYTE 5 in the A buffer as indicated in CHART IIA. Similary, the F2 bit is loaded into the BIT 7 position of BYTE 5.

In FIG. 3. each time the reformat counter 63 is stepped by the RC0 pulse, the byte address is incre-

CHART IIA

| | | 0 | 1 | 2 | 3 | 4 | 5 | 6 | 7 | 8 | 9 | (DAB) 10 | 11 | 12 | 13 | 14 | 15 | 16 | 17 | 18 | 19 |
|---|---|---|---|---|---|---|---|---|---|---|---|---|---|---|---|---|---|---|---|---|---|
| | 7 | | F0 | | F1 | | F2 | | F3 | | | F4 | | F5 | | F6 | | F7 | | F8 | | F9 |
| | 6 | | | | | | C1 | | C1 | | | C1 | | C1 | | C1 | | C1 | | C2 | | C2 |
| | 5 | D0 | D1 | D2 | | | | | | | | D3 | D4 | D5 | D6 | D7 | | | | | | |
| BIT | 4 | D0 | D1 | D2 | | | | | | | | D3 | D4 | D5 | D6 | D7 | | | | | | |
| | 3 | D0 | D1 | D2 | | | | | | | | D3 | D4 | D5 | D6 | D7 | | | | | | |
| | 2 | D0 | D1 | D2 | | | | | | | | D3 | D4 | D5 | D6 | D7 | | | | | | |
| | 1 | D0 | D1 | D2 | | | | | | | | D3 | D4 | D5 | D6 | D7 | | | | | | |
| | 0 | D0 | D1 | D2 | | | | | | | | D3 | D4 | D5 | D6 | D7 | | | | | | |
| | | ← SUFFIX → | | | | | | | | | | ← BODY → | | | | | | | | | | |

| | | 20 | 21 | 22 | 23 | BYTE 24 | 25 | 26 | 27 | 28 | 29 | 30 | 31 |
|---|---|---|---|---|---|---|---|---|---|---|---|---|---|
| | 7 | | F10 | | F11 | | F12 | | F13 | | F14 | | F15 |
| | 6 | | C2 | | C2 | | C3 | | C3 | | C3 | | C3 |
| | 5 | D8 | D9 | D10 | D11 | D12 | | | | | D13 | D14 | D15 |
| BIT | 4 | D8 | D9 | D10 | D11 | D12 | | | | | D13 | D14 | D15 |
| | 3 | D8 | D9 | D10 | D11 | D12 | | | | | D13 | D14 | D15 |
| | 2 | D8 | D9 | D10 | D11 | D12 | | | | | D13 | D14 | D15 |
| | 1 | D8 | D9 | D10 | D11 | D12 | | | | | D13 | D14 | D15 |
| | 0 | D8 | D9 | D10 | D11 | D12 | | | | | D13 | D14 | D15 |
| | | ← PREFIX → | | | | | | | | | ← LINE → | | | mented by 1. Also, the S1 counter 66 and the S2 counter 67 are each stepped by the CRSC signal each time counter 63 is stepped by the RC0 signal.

In the example chosen, the 4-bit S1 field loaded into counter 66 is binary 1100. After three input CRSC signals, a carry-out CY is produced from counter 66 which is input to circuitry 73. Circuitry 73 in turn loads the reformat counter with a count of 9. With reformat counter 63 at a count of 9, the low-order RC counter 64-4 is stepped six times to load the 6-bit D3 field from BYTE 3 shown in CHART I into BYTE 9 of the A buffer 60 shown in CHART IIA. After the bits BIT 0, . . ., BIT 5 of BYTE 9 have been loaded with the D3 data field as shown in CHART IIA, the AB signal from generator 47 of FIG. 6 switches the byte addressing from counter 63 to counter 64. Therefore, BIT 6 of BYTE 3 (CHART I) is loaded into BIT 6 of BYTE 7 (CHART IIA). Similarly, the F3 flag of BIT 7 in BYTE 3 (CHART I) is loaded into BIT 7 of BYTE 7 (CHART IIA).

The loading of the remainder of the body characters D4, D5, D6 and D7 proceeds in the same manner that D3 was loaded. The associated flags F4, F5 and F6 and additional bits of the C1 code are also loaded in the manner previously indicated. Each time one of the characters D3 through D7 is loaded as indicated in CHART IIA, the reformat counter is incremented by the RC0 pulse to increment the byte address. Concurrently with incrementing the reformat counter 63, the S1 and S2 counters are incremented by the CRSC signal. The S2 field in the example chosen is initially loaded with binary 0111. After counting the three pulses which produced a carry-out from the S1 counter, the S2 counter has a count of 1010. After five additional input counts, the S2 counter provides a carry-out CY which is input to circuit 74. Circuit 74 loads a count of 20 into the format counter 63.

The next step of the reformat apparatus of FIG. 3 is to load the D8 field from BYTE 8 (CHART I) into the BYTE 20 field of the A buffer 60 as shown in CHART IIA. After the 6 bits BIT 0 through BIT 5 (CHART II) are loaded, the AB signal switches the byte addressing from reformat counter 63 to the RC counter 64. BIT 6 of BYTE 8 (CHART I) contains the first bit of the C2 code which is stored in BIT 6 of BYTE 17 as shown in CHART IIA. Similarly, the F8 flag is stored in BIT 7 of BYTE 17 of CHART IIA. The loading of the remainder of the prefix characters D9, D10, D11 and D12 and the associated code and flag bits is performed in the same manner as for the D8 field.

When a count 26 of the RC counter has been reached, a signal RC 26 is generated which enables the operation of the preset circuitry 75. Circuitry 75 presets the reformat counter 63 to a 29-count.

With the counter 63 set to a 29-count, the D13 field is loaded into BYTE 29 while the C3 and F13 fields are loaded into BYTE 27 (CHART IIA). The reformat counter is incremented to BYTE 30 and thereafter to BYTE 31 with the data, codes and flags loaded as indicated in CHART IIA.

In summary, the reformat apparatus of FIG. 3, one record item having a format shown in CHART I is reformatted and loaded into the A buffer 60 with a format shown in CHART IIA.

After the first reformatted record item is loaded in buffer 60, a second record item is reformatted and loaded into the B buffer. At the same time that the second item is being loaded into the B buffer at byte addresses controlled by the reformat counter 63, the RC counter 64-6 and the RC counter 64-4 are operative to address the A buffer 60 to read out data through selection circuit 62 to the DAB bus 77 and through selection circuit 70 to the DSIN bus 29.

In CHART IIA, the BIT 7 location for each byte on DAB line 77 is replaced with memory unit address bits by selection circuit 70 to form information on DSIN line 29 having the format of the following CHART IIB. In CHART IIB, BYTES 0, . . ., 3 contain the record address(RA), BYTES 8, . . ., 12 contain the sector address(SA), BYTES 16, . . ., 23 contain the track address(TA), and BYTES 24, . . ., 27 contain the disc address(DK). The memory unit address is loaded by operation of the selection circuit 70 which gates out one address bit from DTSR line 50 whenever it receives an output from decoder 78. Decoder 78 decodes a 111 count from the RC counter 64-4 to provide a signal during BIT 7 of each byte in CHART IIA and CHART IIB.

CHART IIB

| | | | | | | | | | | (DSIN) BYTE | | | | | | | | | | |
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| BIT | 7 | RA0 | RA1 | RA2 | RA3 | 0 | 0 | 0 | 0 | SA0 | SA1 | SA2 | SA3 | SA4 | 0 | 0 | 0 | TA0 | TA1 | TA2 | TA3 |
| | 6 | | | | | C1 | | C1 | | | C1 | | C1 | | C1 | | C1 | | C2 | | C2 |
| | 5 | D0 | D1 | D2 | | | | | | | D3 | D4 | D5 | D6 | D7 | | | | | | | |
| | 4 | D0 | D1 | D2 | | | | | | | D3 | D4 | D5 | D6 | D7 | | | | | | | |
| | 3 | D0 | D1 | D2 | | | | | | | D3 | D4 | D5 | D6 | D7 | | | | | | | |
| | 2 | D0 | D1 | D2 | | | | | | | D3 | D4 | D5 | D6 | D7 | | | | | | | |
| | 1 | D0 | D1 | D2 | | | | | | | D3 | D4 | D5 | D6 | D7 | | | | | | | |
| | 0 | D0 | D1 | D2 | | | | | | | D3 | D4 | D5 | D6 | D7 | | | | | | | |
| | | ◄——— SUFFIX ———► | | | | | | | | ◄——— BODY ———► | | | | | | | | | | | |

| | | | | | | | BYTE | | | | | | |
|---|---|---|---|---|---|---|---|---|---|---|---|---|---|
| | | 20 | 21 | 22 | 23 | 24 | 25 | 26 | 27 | 28 | 29 | 30 | 31 |
| BIT | 7 | TA4 | TA5 | TA6 | TA7 | DK0 | DK1 | DK2 | DK3 | 0 | 0 | 0 | 0 |
| | 6 | | C2 | | C2 | | C3 | | C3 | | C3 | | C3 |
| | 5 | D8 | D9 | D10 | D11 | D12 | | | | | D13 | D14 | D15 |
| | 4 | D8 | D9 | D10 | D11 | D12 | | | | | D13 | D14 | D15 |
| | 3 | D8 | D9 | D10 | D11 | D12 | | | | | D13 | D14 | D15 |
| | 2 | D8 | D9 | D10 | D11 | D12 | | | | | D13 | D14 | D15 |
| | 1 | D8 | D9 | D10 | D11 | D12 | | | | | D13 | D14 | D15 |
| | 0 | D8 | D9 | D10 | D11 | D12 | | | | | D13 | D14 | D15 |
| | | ◄——— PREFIX ———► | | | | | | | | ◄— LINE —► | | | |

From the above description it is clear that the suffix, body and prefix fields are of variable length. Specifically, the lengths of the fields are determined by the S1 and S2 fields of the first byte of each record item.

While the S1 and S2 fields provide a mechanism for handling variable length fields, they also provide a mechanism for changing the order of the fields. For example, if it is desired to interchange the order of the body and the prefix in CHART II, then the S1 and S2 fields are interchanged in the counters 66 and 67. With the fields in the counters 66 and 67 interchanged, the S2 counter provides a carry-out after the D2 field is stored. The carry-out from counter 67 is input to circuit 74 which forces the reformat counter 63 to a count of 20. Thereafter, the D3, D4, D5, D6 and D7 fields are stored in bytes BYTE 20, BYTE 21, BYTE 22, BYTE 23, BYTE 24, respectively (CHART IIA). After five additional counts are input to the S1 counter 66, it then produces a carry-out causing the circuitry 73 to force the reformat counter 63 to a 9-count. With the counter 63 at a 9-count, the data fields D8, D9, D10, D11 and D12 are stored in bytes BYTE 9, BYTE 10, BYTE 11, BYTE 12 and BYTE 13, respectively (CHART IIA). Thereafter, when the RC counter reaches a count of 26, the reformat counter 63 is forced to a 29-count by the operation of circuitry 75. In this manner, the order of the body at the prefix shown in CHART IIA is interchanged as a result of interchanging the S1 and S2 fields.

While the reformat circuitry of FIG. 3 has been described with respect to two field boundaries specified by the counters 66 and 67, any number of fields can be accommodated by adding additional counters like counters 66 and 67 and corresponding preset circuits like circuits 73 and 74.

An example of a part number which is typical of the record item is as follows:

TRI 2900A D871-3Q4.

The letters TRI represent the manufacturing line where TRI is an abbreviation, for example, of TRIAD CORPORATION. The part number includes a prefix 2900A, a body D871- and a suffix 3Q4. In accordance with the format of CHART II, the suffix D0 character is 4, the D1 character is Q and the D2 character is 3. In the body, the D3 character is — and the D4 character is 1, the D5 character is 7, the D6 character is 8 and the D7 character is D. In the prefix, the D8, D9, D10, D11 and D12 characters are A, 0, 0, 9 and 2, respectively. The line characters D13, D14 and D15 are I, R and T, respectively. While the above part number for a given manufacturing line has been selected as an example, the prefix, body and suffix fields can vary for each part number or for a class of part numbers. For example, the part numbers for a given manufacturing line are typically all formatted with the same field boundaries. An example of part numbers which are stored in memory unit 2 are given in the following CHART III.

One sort which might be desired is to obtain all of the record items in CHART III which are between a lower limit LL, and an upper limit UL, as follows:

LL = TRI 2900A B871-3Q4
UL = TRI 2900A M871-3Q4.

For clarity in explanation, all characters in the record item part number examples have been chosen with the CHART II format and are identical except for the first character in the body. Accordingly, the record items can be identified using only the first character of the body. The lower limit record item is identified as B, the upper limit is identified as M and the items in CHART III are D, J, F, B, A, E, G, L, P, I, H, C and K.

CHART III

| ABBREVIATION | RECORD ITEM |
| --- | --- |
| D | TRI 2900A D871-3Q4 |
| J | TRI 2900A J622-PS8 |
| F | TRI 2900A F154000 |
| B | TRI 2900A B7094 |
| A | TRI 2900A A870-309 |
| E | TRI 2900A E793- |
| G | TRI 2900A G871-3Q4 |
| L | TRI 2900A L871-3Q4 |
| P | TRI 2900A P871-3Q4 |
| I | TRI 2900A I871-3Q4 |
| H | TRI 2900A H003-3Q4 |
| C | TRI 2900A C871-3Q4 |
| K | TRI 2900A K9018 |

The sort operation commences by loading the lower and upper limits. The lower limit is typically on the DOB bus 26 of FIG. 1 from where it is converted to serial-by-bit by selection circuit 8 and output on the DIN bus 28 for storage in the lower limit store 16 of FIG. 4. Store 16 is enabled by the WELL signal from the select circuit 34 of FIG. 2. In a similar manner, the upper limit is loaded into the upper limit store 17 via the DIN bus at a time that the WEUL signal is generated by the select circuit 33 of FIG. 2. The format of the upper limit and the lower limit items in the stores 16 and 17, in the example described, is the same as the format of the data in the A and B buffers as shown in CHART IIA.

At the time that the lower limit store 16 is loaded with the lower limit, the item sort buffer stores (ISBS) 13-0 trhough 13-7 are also enabled by the signal WELL and are written with all 1's provided by the OR gate 85 of FIG. 4.

The operation in FIG. 4 is initiated by PLROP signal which loads the ISAD registers 14-0 through 14-7 with an initial sequence of item sort addresses. While the PLROP signal also loads operation codes into register 33 of FIG. 2, the present example assumes that no flags or codes are present and hence they can be ignored. Also, the RSTEQ* signal is input to the comparators 9 to clear the equality flip-flops (see FIG. 5 flip-flops 109) in readiness for the start of a sort.

With the B and M lower and upper items stored in the stores 16 and 17, the next step in the sort operation is to access the first record item which is the D part number (see CHART III above). The D record item is accessed from the memory unit 2, is transferred through the data register 3, is placed on the DOB bus 26, is converted to serial-by-bit and is input to the reformat circuitry 6 where it is input to the A buffer. The memory unit address from which the D record item is accessed is the first address at which record items are stored in memory unit 2.

The first byte of the D record item contains the field boundary codes which are written in the S1 and S2 registers in the manner previously described. The S1 and S2 registers in conjunction with the reformat counter 63 and the record counter 64 reformat the D item and store it in the A buffer 60. After the D record item is stored in buffer 60, the J item is accessed from the second address in memory unit 2, is reformatted, and is stored in the B buffer 61. While the J record item is being stored in the B buffer, the D item is being accessed from the A buffer with code and flag information on the DAB line 77, with data characters gated out over the DSIN line 29, and with the memory unit address added to BIT 7 of each byte on the DSIN line.

With the first byte of the J record item stored in the S1 and S2 registers, the reformat counter 63 is stepped to the 0 count allowing the CSORT signal to be generated by generator 47 of FIG. 2 for each bit of the D record item which is gated onto DSIN line 29.

The details of the FIG. 4 sort operation are described in conjunction with the following CHART IV. In CHART IV, the sort operation consists of a first search, SEARCH I, which includes steps S1 through S14 and a second search, SEARCH II, which includes steps S1 through S14. During SEARCH I, the contents of the lower limit store 16 remain the B item.

In step 1, all the item sort buffer store ISBS-0 through ISBS-7 have been loaded with all 1's. The all 1's are indicated in CHART IV for step S1 by a "1" in each of the ISBS columns. In CHART IV, the initial sequence of addresses in the item sort address registers ISAD-0 through ISAD-7 for step S2 is indicated as 0, 1, 2, 3, 4, 5, 6 and 7. Those addresses are the addresses loaded into the registers 14-0 through 14-7 by the PLROP signal.

The contents of ISAD-7 is 7 (in binary notation, 111) in step S1. The value in ISAD-7 is decoded by the decoder 15 to select, via gate 88 and the enable line 87-7, the ISBS-7 store 13-7. Accordingly, ISBS-7 is enabled to receive the D record item which appears on the DSIN line 29. The addresses in ISBS-7 at which the bits of the D item are stored are defined by the address bus 30. Selection circuit 89 selects the address bits on bus 30 from bus 82 which is derived from the RC counter 64 in FIG. 3. The RC counter addresses the A buffer 60 in FIG. 3 to fetch the D record item and concurrently addresses the buffer store ISBS-7 to store the D record item. In CHART II, the storage of the D item in ISBS-7 is indicated in step S2.

As the D item is loaded into ISBS-7, the D item is concurrently compared with the lower and upper limits in comparators 10 and 11 and with the contents of buffer stores ISBS-0, . . ., ISBS-6 in comparators COM-0, . . ., COM-6. The DGLL and DLUL signals are output from limit comparators 10 and 11 indicating that the D item is between LL and UL. Since all of the stores ISBS-0 through ISBS-6 contain all 1's all of the comparators COM-0, . . ., COM-6 produce a "less than" signal. The "less than" signals from each of comparators are input to the respective transfer circuits XFR-0, . . ., XFR-6. With "less than" signals input to the transfer circuits, all item sort addresses in the ISAD registers 14 are transferred by ADSCK pulses. For example, the 7 stored in ISAD-7 is transferred to ISAD-0 and the 0 in ISAD-0 is transferred to ISAD-1. As indicated in step S2 of CHART IV, the registers ISAD-7, ISAD-0, . . ., ISAD-6 store counts 6, 7, 0, 1, 2, 3, 4 and 5, respectively.

With a 6 in ISAD-7 the decoder circuit 15 enables the ISBS-6 store (not explicitly shown in FIG. 4) for receiving the new J record item on the DSIN line 29 from buffer 61. ISAD-0 stores a 7, so that ISBS-7 is selected by selection circuit 12-0 for connection as an input to comparator COM-0. Similarly, the ISAD-1, . . ., ISAD-6 select the stores ISBS-0, . . ., ISBS-5 for input to the comparators COM-1, . . ., COM-6, respectively. With the selection circuits 12 energized in this manner, the J item is presented on the DSIN line 29 for comparison in the comparators 9 and for storing in ISBS-6. The storage of J in ISBS-6 is indicated in step S3 of CHART IV. In step S3, the D record item remains in ISBS-7, J is placed in ISBS-6 while ISBS-0, . . ., ISBS-5 retain all 1's.

The new J item on DSIN is compared with the D item from ISBS-7 in comparator COM-0. The comparison indicates that D is "less than" J. The outputs from all other comparators COM-1, . . ., COM-6 indicate that

CHART IV

| SEARCH I | LL | ISBS | | | | | | | | ISAD | | | | | | |
|---|---|---|---|---|---|---|---|---|---|---|---|---|---|---|---|---|
| | | 0 | 1 | 2 | 3 | 4 | 5 | 6 | 7 | 7 | 0 | 1 | 2 | 3 | 4 | 5 | 6 |
| S1 | B | 1 | 1 | 1 | 1 | 1 | 1 | 1 | 1 | 7 | 0 | 1 | 2 | 3 | 4 | 5 | 6 |
| S2 | B | 1 | 1 | 1 | 1 | 1 | 1 | 1 | D | 6 | 7 | 0 | 1 | 2 | 3 | 4 | 5 |
| S3 | B | 1 | 1 | 1 | 1 | 1 | 1 | J | D | 5 | 7 | 6 | 0 | 1 | 2 | 3 | 4 |
| S4 | B | 1 | 1 | 1 | 1 | 1 | F | J | D | 4 | 7 | 5 | 6 | 0 | 1 | 2 | 3 |
| S5 | B | 1 | 1 | 1 | 1 | B | F | J | D | 3 | 4 | 7 | 5 | 6 | 0 | 1 | 2 |
| S6 | B | 1 | 1 | 1 | A | B | F | J | D | 3 | 4 | 7 | 5 | 6 | 0 | 1 | 2 |
| S7 | B | 1 | 1 | 1 | E | B | F | J | D | 2 | 4 | 7 | 3 | 5 | 6 | 0 | 1 |
| S8 | B | 1 | 1 | G | E | B | F | J | D | 1 | 4 | 7 | 3 | 5 | 2 | 6 | 0 |
| S9 | B | 1 | L | G | E | B | F | J | D | 0 | 4 | 7 | 3 | 5 | 2 | 6 | 1 |
| S10 | B | P | L | G | E | B | F | J | D | 0 | 4 | 7 | 3 | 5 | 2 | 6 | 1 |
| S11 | B | I | L | G | E | B | F | J | D | 1 | 4 | 7 | 3 | 5 | 2 | 0 | 6 |
| S12 | B | I | H | G | E | B | F | J | D | 6 | 4 | 7 | 3 | 5 | 2 | 1 | 0 |
| S13 | B | I | H | G | E | B | F | C | D | 0 | 4 | 6 | 7 | 3 | 5 | 2 | 1 |
| S14 | B | K | H | G | E | B | F | C | D | 0 | 4 | 6 | 7 | 3 | 5 | 2 | 1 |

| SEARCH II | LL | ISBS | | | | | | | | ISAD | | | | | | |
|---|---|---|---|---|---|---|---|---|---|---|---|---|---|---|---|---|
| | | 0 | 1 | 2 | 3 | 4 | 5 | 6 | 7 | 7 | 0 | 1 | 2 | 3 | 4 | 5 | 6 |
| S1 | H | 1 | 1 | 1 | 1 | 1 | 1 | 1 | 1 | 7 | 0 | 1 | 2 | 3 | 4 | 5 | 6 |
| S2 | H | 1 | 1 | 1 | 1 | 1 | 1 | 1 | D | 7 | 0 | 1 | 2 | 3 | 4 | 5 | 6 |
| S3 | H | 1 | 1 | 1 | 1 | 1 | 1 | 1 | J | 6 | 7 | 0 | 1 | 2 | 3 | 4 | 5 |
| S4 | H | 1 | 1 | 1 | 1 | 1 | 1 | F | J | 6 | 7 | 0 | 1 | 2 | 3 | 4 | 5 |
| S5 | H | 1 | 1 | 1 | 1 | 1 | 1 | B | J | 6 | 7 | 0 | 1 | 2 | 3 | 4 | 5 |
| S6 | H | 1 | 1 | 1 | 1 | 1 | 1 | A | J | 6 | 7 | 0 | 1 | 2 | 3 | 4 | 5 |
| S7 | H | 1 | 1 | 1 | 1 | 1 | 1 | E | J | 6 | 7 | 0 | 1 | 2 | 3 | 4 | 5 |
| S8 | H | 1 | 1 | 1 | 1 | 1 | 1 | G | J | 6 | 7 | 0 | 1 | 2 | 3 | 4 | 5 |
| S9 | H | 1 | 1 | 1 | 1 | 1 | 1 | L | J | 5 | 7 | 6 | 0 | 1 | 2 | 3 | 4 |
| S10 | H | 1 | 1 | 1 | 1 | 1 | P | L | J | 4 | 7 | 6 | 5 | 0 | 1 | 2 | 3 |
| S11 | H | 1 | 1 | 1 | 1 | I | P | L | J | 3 | 4 | 7 | 6 | 5 | 0 | 1 | 2 |
| S12 | H | 1 | 1 | 1 | H | I | P | L | J | 3 | 4 | 7 | 6 | 5 | 0 | 1 | 2 |
| S13 | H | 1 | 1 | 1 | C | I | P | L | J | 3 | 4 | 7 | 6 | 5 | 0 | 1 | 2 |
| S14 | H | 1 | 1 | 1 | K | I | P | L | J | 2 | 4 | 7 | 3 | 6 | 5 | 0 | 1 | the new record item J is less than the contents of the buffer stores ISBS-0, . . ., ISBS-5, respectively.

The output from comparator COM-0 is a "greater than" signal which is input to XFR-1. Accordingly, XFR-1 does not transfer the contents of ISAD-0 and hence, ISAD-0 retains a 7.

With a "greater than" input, XFR-1 receives the output from ISAD-7 and transfers it to ISAD-1. Since all of the comparators COM-1, . . ., COM-6 output "less than" signals, the transfer circuits XFR-2, . . ., XFR-6 and XFR-0 function to transfer item sort addresses. After the transfers, the registers ISAD-7, ISAD-0, . . ., ISAD-6 store the item sort addresses 5, 7, 6, 0, 1, 2, 3 and 4, respectively, as indicated in the step S3 of CHART IV. The transfers are made as usual by ADSCK pulses which shift the contents of the registers 14 in the manner indicated.

With the item sort addresses stored in the registers 14, the selection circuits 12 makes the new connections of the ISBS stores 13 to the comparators 9. The comparators 9 and the comparators 10 and 11 are then ready to receive the next new record item.

The next new record item is F which is accessed from the buffer 60 of FIG. 3. Since a 5 is stored in the ISAD-7, ISBS-5 receives the F record item. In the comparisons in comparators 9, COM-0 determines that F is "greater than" D. Concurrently COM-1 determined that F is "less than" J. Similarly, each of the comparators COM-2 through COM-6 produce a "less than" output.

Under these conditions, XFR-1 receives a "greater than" signal while XFR-2, . . ., XFR-6 receive "less than" signals. Under these conditions, since XFR-0 does not receive a "less than" signal it does not transfer anything into ISAD-0 so that ISAD-0 retains a 7. XFR-1 accepts the output from ISAD-7 and stores a 5 into ISAD-1. After the transfers of step S4, the registers ISAD-7, ISAD-0, . . ., ISAD-6 store item sort addresses 4, 7, 5, 6, 0, 1, 2 and 3, respectively. With the new address sequence in ISAD registers 14, selection circuits 12 responsively connect the ISBS stores to the COM comparators in readiness for the next record item.

The next record item is B accessed from buffer 61. The B record item produces a "less than" output from all comparators 9. The B record item also produces a DELL signal from comparator 11 which is connected on bus 31 to the control circuitry of FIG. 2. In FIG. 2, the DELL signal is input to the equality circuit 43. Since the sort unit of FIG. 4 is operating on SEARCH I, however, the INTSC signal is also input to circuit 43 inhibiting circuit 43 from producing an output even though the DELL signal is present. Accordingly, the circuit 43 does not function to inhibit the ADSCK pulses from being generated from gate 46 in response to the ENRGU signal. After the shift pulses in step S5, the registers ISAD-7, ISAD-0, . . ., ISAD-6 store the item sort addresses 3, 4, 7, 5, 6, 0, 1 and 2, respectively, in readiness for the next new record item.

The next new record item is A from buffer 60 which is stored in ISBS-3 in accordance with the contents of ISAD-7. Although, the comparators 9 in FIG. 4 determine that the A record item is less than all values in the ISBS, comparator 11 also determined that the new record item is less than the lower limit and therefore provides a DLLL signal on bus 31. The DLLL signal on bus 31 is input to the control of FIG. 2 to reset the latch 45 and inhibit output pulses ADSCK. Witn no ADSCK pulses, no item sort addresses are transferred. Hence, at the end of the step S6, the contents of the ASAD registers are the same as at the end of step S5. The A record item in ISBS-3 is overwritten by the next record item since the contents of ISAD-7 have not changed.

The next new record item from buffer 61 is E. After the comparisons of E, item sort address transfers occur resulting in the address sequence indicated in step S7.

In steps S8 through S14, all of the new record items G, L, P, I, H, C and K are fetched and compared in the manner previously indicated. After each comparison, a transfer of item sort addresses occurs as shown in CHART IV.

After the transfer of the final step S14, the registers ISAD-7, ISAD-0, . . ., ISAD-6 store the addresses 0, 4, 6, 7, 3, 5, 2 and 1, respectively. After step 14, address bits on bus 90 energize the select out circuitry 20 to select in order the seven selection circuits 12-0, . . ., 12-6 which are in turn controlled by registers ISAD-0, . . ., ISAD-6. ISAD-0 inputs an address of 4 to circuit 12-0 causing record item B to be read out first from ISBS-4. Selection circuit 20 next selects circuit 12-1 which receives a 6 from ISAD-1. Accordingly, selection circuit 12-1 selects C from ISBS-6 as the second record item read out. In general, the address sequence 4, 6, 7, 3, 5, 2 and cause the record items to be accessed from the ISBS stores in the order B, C, D, E, F, G and H. Accordingly, the sort unit during the SEARCH I operation has selected the lowest order set of seven record items from all the record items of CHART III. When the record items are read out they are accessed in order.

When selection circuit 20 selects the output from selection circuit 12-6, the H record item from ISBS-1 is input through selection circuit 86 and stored in the lower limit store 16. This storage occurs by enabling the WELL signal which also causes all of the ISBS stores 13 to be loaded to all 1's.

With the new lower limit H loaded and with the ISBS stores cleared to all 1's, the sort unit of FIG. 4 is ready to commence the second search, SEARCH II, as shown in CHART IV.

SEARCH II commences in the same way as SEARCH I. The PLROP signal loads the initial sequence of item sort addresses into the ISAD register 14. In FIG. 2, however, the INTSC signal is not loaded into the operation register 33. The first record item D is fetched and stored in ISDS-7 in step S2. Since D is less than H, the circuitry of FIG. 2 inhibits transfer pulses and hence the contents of the ISAD registers do not change.

The new record item J is fetched and is also stored in ISBS-7. Since J is between the lower limit H and the upper limit M, transfer pulses occur and the item sort addresses appear as shown in step S3.

The next new record item F is stored in ISBS-6. Since F is less than the lower limit H, no transfers occur in the item sort addresses. None of the new record items B, A, E and G in steps S5, S6, S7 and S8 are within the search limits and hence no transfer of item sort addresses occur. A new record item L is within the limits and is stored in ISBS-6 in step S9. A transfer in the record item addresses as shown in step S9.

The new record item P also is within limits and is stored in ISBS-5 with a transfer occuring as shown in step S10. Similarly, in step S11, the record item I is stored in ISBS-4 and a resulting transfer of item sort addresses occurs.

The new record item H is stored in ISBS-3. Since H equals the lower limit, a DELL signal is generated and is input to the control circuitry of FIG. 2. In FIG. 2, the INTSC signal is no longer present and hence the circuitry 43 causes the latch 45 to be reset inhibiting the ADSCK clock pulses from gate 46. Accordingly, at the end of the step S12, no transfer occurs in the item sort addresses and they remain the same as at the end of the step S11.

In step S13, the new record item C is not within the limits and hence no transfer in item sort addresses occurs.

The final record item K is stored in ISBS-3. Since K is between the limits, a transfer occurs. At the end S14, the item sort addresses for registers ISAD-0, . . ., ISAD-6 are 4, 7, 3, 6, 5, 0 and 1. The corresponding entries in the ISBS stores are I, J. L, all 1's, and all 1's. When the record items are accessed in order from the ISBS by the selection circuitry 20 and are output on the DIB line 27, the all 1's of a record item from the ISBS stores is detected to signal the end of the sort operation.

FIELD ORDER REVERSAL

The field order without reversal is line, prefix, body and suffix. At times, however, it is desirable to change the field order, for example, with an order of line, body, prefix and suffix.

To explain the field order reversal, a hypothetical XYZ company is assumed to be a manufacturer of automobile parts. The XYZ company designates parts using part numbers which have a prefix which represents detailed variations in a basic product where the basic product is specified by the body of the part number. The body represents different products such as gas caps, tail pipes, hub caps and similar auto parts. In the hypothetical case of gas caps, for example, the prefix represents color while the body represents gas caps of different sizes for use on different automobiles. The XYZ company represents all gas caps between an upper limit body number and a lower limit body number. The XYZ company for purposes of the present example does not use a suffix.

A typical report for the XYZ company is an ordered listing of all gas caps. The report typically desired is the alphameric ordering of the body portion of the part number thereafter followed by color. Since ordering is desired using the body, the order of the body field and the prefix field are reversed in generating the report. If the body and prefix are not reversed, then the report generated is organized first with all gas caps of one color, followed by all gas caps of a next color and so on. The report generated without reversal of fields is not organized alphamerically by the body of the part number. By reversing the order of the prefix and body fields, however, the order is alphameric by the body of the part number.

To perform a search operation which will order the XYZ company gas caps alphamerically using the body field of the part number, the upper and lower limit stores are first loaded. The line field identifying the manufacturer for both the upper and lower limit stores is "XYZ." Next, because of the field reversal, the body field for the upper and lower limit stores is loaded with the upper and lower limits of the body portion of the part numbers which include all the gas caps of the XYZ company. The upper and lower limit prefix fields are stored as all 1's and all 0's, respectively, since gas caps of all colors are desired. Similarly, the suffix fields in the limit stores are stored with all 1's and all 0's so that the suffix field is essentially ignored in the search operation.

The reversal of the body and prefix fields in the memory unit for each record item is carried out with the S1 and S2 pointer fields stored in the first byte of each record item at the time they are stored in the memory unit. The reversal of the S1 and S2 pointer fields has been previously described in connection with FIG. 3. The S1 and S2 pointer fields both specify the field boundaries but also reverse the order of the prefix and body fields for each record item during a search operation.

In the sort operation for locating XYZ company gas caps, any record item which does not have an "XYZ" line field is detected by the upper limit and lower limit comparators thereby excluding any item which is not from XYZ company.

Next, any record item having a body field outside the upper and lower limits is also excluded from the search operation. All prefix and suffix fields will be accepted during the search since the maximum limits are set in the limit stores.

Any record item which is not rejected by the limit store comparisons is retained in the buffer stores and is ordered in accordance with the alphameric order of the body field. Part numbers having identical body fields are grouped together with an order determined by the prefix (color) and suffix fields. In this manner, the desired report is generated.

Another example useful in the automobile parts business hypothetically refers to piston rings. In that example, the body represents the hardness of the piston rings and the prefix represents the size of the piston rings. If it is desired to form a report organized first on size and then on hardness, the line, prefix, body, suffix field order is not altered. However, if it is desired to organize the parts on hardness first and then size, the body and prefix fields are interchanged by interchanging the S1 and S2 fields.

The interchange of the S1 and S2 fields is done manually or automatically. The automatic change may be done under the control of the processor of FIG. 6 or by adding a switch to the FIG. 3 apparatus which cross-connects the carry outputs CY from the counters 66 and 67.

A further example of the reversal of fields is described in connection with a hypothetical distribution route. It is assumed that a company distributes its products to customers in accordance with routes. For example, the delivery of milk by a milkman is such a distribution route. The line field is employed, for example, to identify a particular route. The body is utilized to identify the name of the customer. The prefix is utilized to identify the sequence number which identifies the order in which the customers receive delivery along the route. If it is desired to have a report which is organized by the sequence in which the customers are visited on the delivery route, then the search operation is performed with the unaltered field order of line, prefix, body and suffix. If it is desired to produce a report which organizes customers alphabetically by name, then the fields order altered to line, body, prefix and suffix.

CONTROL FIELD USAGE

The control fields include flag bits and code bits. The flag bits are each one bit and each flag is generally independent of the other flags. The flag bits are typically utilized in connection with data which changes as the data base is utilized. For example, one flag bit is set after a given number of sales of the part have occured thereby flagging the part as a fast selling part. Another flag is typically utilized to denote parts which need to be reordered. Another flag is typically utilized to indicate that no sales have occurred over a given sale period.

The setting of the flags is typically performed under control of the processor of FIG. 6. The record items in the memory unit 2 are typically associated with storage locations in memory unit 2 which record additional information about items such as quantity on hand, quantity sold and price. Each time a sale or other transaction occurs, the memory unit 2 is updated to reflect the transaction, and at the same time, an appropriate flag is set in the control field of the record item if appropriate. Thereafter, reports are generated using the flags to qualify the search operation.

The code fields as distinguished from flags are typically used for specifying information which does not usually change as the data base is used. For example, the code fields typically specify the make of car on which a particular auto part is utilized.

While the invention has been particularly shown and described with reference to preferred embodiments thereof it will be understood by those skilled in the art that various changes in form and details may be made therein without departing from the spirit and the scope of the invention.

What is claimed is:

1. An apparatus for sorting information items into an ordered sequence of items running between a lowest order item and a highest order item, comprising, memory unit means for storing the items to be sorted, a plurality of buffer stores each for storing one of said items, a plurality of comparators, each for comparing an item from one of said buffer stores with an item from said memory unit means to provide, for each comparator, "greater than" and "less than" comparator outputs signifying the results of comparing said items, a plurality of address means for storing item addresses in an address sequence where said item addresses are associated with buffered items in said buffer stores, a plurality of selection means for connecting said buffer stores to said comparators, each under control of an item address in a corresponding one of said address means, transfer means including a plurality of transfer circuits, each connected between one of said address means and an adjacent one of said address means and each for selectively transferring the item addresses between said one and said adjacent one of said address means in response to a "greater than" comparator output from one of said comparators corresponding to said one of said address means, said transfer means including means for transferring an item address for each said item from said memory unit means to any one of said address means having a "greater than" comparator output from a corresponding address means on one side and a "less than" comparator output from a corresponding address means on the other side of said one of said address means, said transfer means thereby establishing said address sequence as a sorted order of said item addresses, output means for reading out items, from the buffer stores selected by said selection circuits, in said sorted order of said item addresses.

2. The apparatus of claim 1 wherein said memory unit items each include one or more fields and said apparatus includes reformat means for reformatting said memory unit items to align said fields on predetermined field boundaries whereby said apparatus compares corresponding fields of memory unit items.

3. The apparatus of claim 2 wherein said reformat means includes, buffer store means for storing reformatted items from said memory unit means, buffer address means for addressing said buffer store means to store and fetch items into an out from said buffer store means, stepping means for stepping said buffer address means to store items in said buffer store means, field boundary means for forcing said buffer address means to predetermined addresses to align said fields in said buffer store means on predetermined field boundaries.

4. The apparatus of claim 3 wherein said buffer store means includes first and second buffer stores, wherein said buffer address means includes a reformat counter and a record counter, and wherein said reformat means includes selection means for connecting said reformat counter to address and store reformatted items into one of said buffer stores and for connecting said record counter to address and fetch reformatted record items from the other of said buffer stores.

5. The apparatus of claim 4 wherein said stepping means includes means for stepping said record counter with twice as many pulses as said reformat counter.

6. The apparatus of claim 3 wherein said field boundary means includes field counter means, stepped by said stepping means, for producing an output at a predetermined count and includes preset means for presetting said buffer address means to a predetermined address when said field counter means reaches said predetermined count.

7. The apparatus of claim 6 wherein said field counter means includes means for producing outputs at a number of predetermined counts and wherein said preset means includes a number of preset circuits, one for each of said predetermined counts, for forcing said buffer address means to a different predetermined address for each predetermined count.

8. The apparatus of claim 6 wherein said field counter means includes a first field counter operative to produce an output at a first field count and a second field counter operative to produce an output at a second field count, and wherein said field boundary means includes a first preset means responsive to the output from said first field counter to force said buffer address means to a first predetermined address and includes second preset means responsive to the output from said second field counter to force said buffer address means to a second predetermined address, said apparatus aligning items with one field order when said first field count is reached before said second field count and aligning items with another field order when said second field count is reached before said first field count.

9. The apparatus of claim 1 including, a lower limit store and an upper limit store for storing a lower limit item and an upper limit item, respectively, said limit items defining the limits between which items are accepted for sorting, a lower limit comparator and an upper limit comparator for comparing items to be sorted from said memory unit with said lower limit item and said upper limit item, respectively, control means responsive to said comparators for inhibiting an item from being included in a sort operation if an item from said memory unit is not between said lower limit item and said upper limit item.

10. The apparatus of claim 9 wherein items from said memory unit include an item control field and wherein said upper limit store includes means for storing a search control field whereby said upper limit comparator compares said item control field and said search control field and said control means inhibits said transfer means from transferring item addresses in response to the output from said upper limit comparator in the comparison of said item control field and said search control fields.

11. The apparatus of claim 10 wherein said control fields include an item flag and a search flag wherein an item is ignored in the sort operation if a search flag is set and an item flag is not set.

12. The apparatus of claim 10 wherein said control fields include item codes and search codes wherein an item is ignored in the sort operation if the search code and the item code are not identical.

13. The apparatus of claim 9 including means for storing an item from one of said buffer stores in said lower limit store after all items from said memory unit have been sorted to prepare for a new sort with a new lower limit.

14. The apparatus of claim 1 wherein said memory unit means stores item control fields associated with said items and wherein said apparatus includes, means for storing search control fields, comparator means for comparing said item control fields and said search control fields, and control means responsive to said comparator means for excluding an item from a sort operation.

15. The apparatus of claim 1 including means for sensing when an item read out from one of said buffer stores equals a predetermined value whereby the end of the sorting operation is indicated.

16. An apparatus for sorting information items into an ordered item sequence where each item has a weighted magnitude determining the item's position between a lowest order item and a highest order item comprising, input means for providing the items to be sorted, store means for storing a group of said items to be sorted as buffered items, comparator means for comparing one of said items to be sorted with each of said buffered items to provide comparator outputs signifying the magnitude of said one of said items relative to said buffered items, address means for storing item addresses, one for each buffered item, in an address sequence where each of said item addresses defines the location of an associated one of said buffered items, selection means for connecting said buffered items to said comparator means under control of said address means, transfer means for transferring the item addresses in said address means to form a new address sequence in response to said comparator outputs so as to transfer between each i th item address and its adjacent i + 1 th item address having a corresponding buffer with a higher order stored item where said new address sequence defines an ordered item sequence for said buffered items.

17. An apparatus for sorting information items into an ordered sequence of items running between a lowest order item and a highest order item, comprising, memory unit means for storing the items to be sorted, a number (N+1) of buffer stores each for storing a different one of said items as a buffered item, a number (N) of comparators, each for comparing a buffered item from one of said buffer stores with one of said items from said memory unit means, each including means to receive said one of said items, and each to provide "greater than" and "less than" comparator outputs signifying the results of comparing said items, a number (N+1) of address registers for storing item addresses in an address sequence, each of said address registers storing an item address identifying one of said buffer stores, a number N of selection circuits each for selecting one of said buffer stores under control of an item address from a corresponding one of said address registers, means for connecting each buffer store selected by said selection circuits to a different one of said comparators as determined by said item addresses, means for connecting said one of said items for storage in one of said buffer stores under control of an item address from an $N^{th}$ one of said address registers, a number N of transfer circuits, each connected between one of said address means and an adjacent one of said address means and each for selectively transferring the item addresses between said one and said adjacent one of said address registers in response to a "greater than" comparator output from one of said comparators corresponding to said one of said address registers, and transfer circuits including means for transferring an item address for each said item from said memory unit means to any one of said address registers having a "greater than" comparator output from a corresponding address register on one side and a "less than" comparator output from a corresponding address register on the other side of said one of said address registers, said transfer means thereby establishing said address sequence as a sorted order of said item addresses, output means for reading out items, from the buffer stores selected by said selection circuits, in said sorted order of said item addresses.

18. The apparatus of claim 17, wherein said buffer stores include the buffer stores 0, . . ., (N−1) and the buffer store N, wherein said comparators include the comparators 0, . . ., (N−1), each of said comparators producing a "less than" or a "greater than" signal as a result of comparing a different buffered item with said one of said items, wherein said address registers include the address registers 0, . . ., N, wherein said transfer circuits include the transfer circuits 0, . . ., (N−1); wherein the $i^{th}$ transfer circuit receives a "less than" signal from the $i^{th}$ comparator for all values of i equal to 0, . . ., (N−1); wherein the $i^{th}$ transfer circuit receives a "less than" and a "greater than" signal from the $(i-1)^{th}$ comparator for all values of i equal to 1, . . ., (N−1);

wherein said $i^{th}$ transfer circuit transfers an item address from the $(i-1)^{th}$ address register into the $i^{th}$ address register in response to a "less than" signal from the $i^{th}$ comparator, wherein said $i^{th}$ transfer circuit transfers an item address from the $N^{th}$ address register into the $i^{th}$ address register when both the $(i-1)^{th}$ comparator produces a "greater than" signal and the $i^{th}$ comparator produces a "less than" signal, for all values of i equal to 1, . . ., (N−1); wherein said $0^{th}$ transfer circuit transfers an item address from the $N^{th}$ address register to the $0^{th}$ address register when the $0^{th}$ comparator produces a "less than" signal; and wherein said $(N-1)^{th}$ address register stores the $(N-1)^{th}$ item address in the $N^{th}$ address register when the $(N-1)^{th}$ comparator produces a "less than" signal.

19. The apparatus of claim 17 wherein said items each includes one or more fields and said apparatus includes reformat means comprising, random access buffer store means for storing items from said memory unit, buffer address means for addressing said buffer store means to store and fetch items into an out from said buffer means, stepping means for stepping said buffer address means to store items in said buffer store means, field boundary means for forcing said buffer address means to predetermined addresses to align said fields of said items in said buffer store means on predetermined field boundaries.

20. The apparatus of claim 19 wherein said field boundary means includes field counter means, stepped by said stepping means, for producing an output at a predetermined count and includes preset means for presetting said buffer address means to a predetermined address when said field counter means reaches said predetermined count.

21. The apparatus of claim 20 wherein said field counter means includes a first field counter operative to produce an output at a first field count and a second field counter operative to produce an output at a second field count, and wherein said field boundary means includes a first preset means responsive to the output from said first field counter to force said buffer address means to a first predetermined address and includes second preset means responsive to the output from said second field counter to force said buffer address means to a second predetermined address, said apparatus aligning items with a first field order when said first field count is reached before said second field count and aligning items with a second field order when said second field count is reached before said first field count.

22. The apparatus of claim 17 including, a lower limit store and an upper limit store for storing a lower limit item and an upper limit item, respectively, said limit items defining the limits between which items are accepted for sorting, a lower limit comparator and an upper limit comparator for comparing items to be sorted from said memory unit with said lower limit item and said upper limit item, respectively, control means responsive to said comparators for inhibiting said transfer means from transferring item addresses if an item from said memory unit is not between said lower limit item and said upper limit item.

23. The apparatus of claim 17 wherein said memory unit means stores item control fields associated with said items and wherein said apparatus includes, means for storing search control fields, comparator means for comparing said item control fields and said search control fields, and control means responsive to said comparator means for inhibiting an item from being included in a sort operation.

24. The apparatus of claim 17 wherein said comparators each includes means for producing an "equal to" signal when the buffered item equals the new item and wherein said apparatus includes control means responsive to each "equal to" signal for inhibiting said transfer circuits from transferring item addresses.

25. In an apparatus for sorting information items into an ordered sequence of items running between a lowest order item and a highest order item, said apparatus having a memory for storing items to be sorted; having means for fetching said items from said memory where each one of said items, when fetched, is a new item to be sorted, having a number (N+1) of buffer storage locations 0, . . ., N each for storing a different one of said new items as a buffered item; having comparator means for comparing each buffered item with new items from said memory; having a number (N+1) of address storage locations 0, . . ., N, each for storing an item address for identifying one of said buffered storage locations; the method comprising the steps of, comparing each new item to be sorted with each buffered item to form the N comparisons 0, . . ., (N−1) each producing a "greater than" or "less than" signal, transferring an item address between the $(i-1)^{th}$ address location and the $i^{th}$ address location in response to a "less than" signal from the $i^{th}$ comparison, for all values of i equal to 1, . . ., (N−1), transferring an item address between the $N^{th}$ address location and the $i^{th}$ address location when both the $(i-1)^{th}$ comparison produces a "greater than" signal and the $i^{th}$ comparison produces a "less than" signal, for all values of i equal to 1, . . ., (N−1), transferring an item address between the $N^{th}$ address location and the $0^{th}$ address location when the $0^{th}$ comparison produces a "less than" signal, transferring the item address between the $(N-1)^{th}$ address location and the $N^{th}$ address location when the $(N-1)^{th}$ comparison produces a "less than" signal whereby said item addresses are established in a sequence, accessing said address storage locations sequentially in order between address storage location 0 and address storage location (N−1) to obtain a sorted order sequence of item addresses, reading out said buffered storage locations in an order determined by said sorted order sequence of item addresses to obtain said buffered items in an ordered sequence.

26. In the method of claim 25, the further steps comprising, comparing each new item with predetermined limits, inhibiting said transferring if said new item is not within said limits.

27. In the method of claim 25, wherein each new item includes an associated item control field and wherein means are provided for storing a search control field, the further steps comprising,
 comparing the item control field for each new item with the search control field,
 inhibiting said transferring if an item control field does not compare with a search control field.

28. In an apparatus for sorting information items into an ordered sequence of items running between a lowest order item and a highest order item, said apparatus having a memory for storing items to be sorted where each item includes one or more fields with a field order; having means for fetching said items from said memory where each one of said items, when fetched, is a new item to be sorted, having reformatting apparatus for aligning fields and for changing the field order to form a new reformatted item for each new item from said memory; having a number (N+1) of buffer storage locations 0, . . ., N, each for storing a different reformatted item as a buffered item; having a number (N) of comparators 0, . . ., (N−1) each for comparing a buffered item with a new reformatted item; having a number (N+1) of address storage locations, 0, . . ., N, each for storing an item address for identifying one of said buffer storage locations; the method comprising the steps of,
 reformatting each new item from said memory to form a reformatted new item,
 simultaneously comparing each new reformatted item with each of said buffered items to form the N comparisons 0, . . ., (N−1) each producing a "greater than" or "less than" signal,
 transferring an item address between the (i−1)$^{th}$ address location and the i$^{th}$ address location in response to a "less than" signal from the i$^{th}$ comparison, for all values of i equal to 1, . . ., (N−1),
 transferring an item address between the N$^{th}$ address location and the i$^{th}$ address location when both the (i−1)$^{th}$ comparison produces a "greater than" signal and the i$^{th}$ comparison produces a "less than" signal, for all values of i equal to 1, . . ., (N−1),
 transferring an item address between the N$^{th}$ address location and the 0$^{th}$ address location when the 0$^{th}$ comparison produces a "less than" signal,
 transferring the item address between the (N−1)$^{th}$ address location and the N$^{th}$ address location when the (N−1)$^{th}$ comparison produces a "less than" signal whereby said item addresses are established in a sequence,
 accessing said address storage locations sequentially in order between address storage location 0 and address storage location (N−1) to obtain a sorted order sequence of item addresses,
 reading out said buffered storage locations in an order determined by said sorted order sequence of item addresses to obtain said buffered items in an ordered sequence.

29. An apparatus for sorting information items into an ordered sequence of items running between a lowest order item and a highest order item, comprising,
 memory unit means for storing items to be sorted where said items include one or more fields, said memory unit means having means for fetching said items where each one of said items, when fetched, is a new item to be sorted,
 reformatting means for reformatting each new item from said memory unit means as a reformatted new item where said reformatted new items have predetermined field boundaries and field orders,
 a plurality of buffer stores, each for storing a different one of said reformatted new items as a buffered item,
 a plurality of comparators, each for comparing a buffered item with a new reformatted item,
 address means for storing a different item address for each of said buffered stores, said address means storing item addresses in an address sequence which defines a buffer store sequence,
 selection means for connecting said buffered stores to said comparators under control of said address means, said item addresses determining which buffered stores are connected to which comparators,
 transfer means for transferring item addresses in said address means in response to outputs from said comparators so as to transfer between each i th item address and its adjacent i + 1 th item address having a corresponding buffer with a higher order stored item to establish said address sequence as a sorted order of item addresses, said sorted order of item addresses defining said buffer store sequence in the sequence which forms an ordered sequence of buffered items.

30. An apparatus for sorting information items into an ordered sequence of items running between a lowest order item and a highest order item, comprising,
 memory unit means for storing items to be sorted where said items include a plurality of fields including at least one item control field, said memory unit means having means for fetching said items where each one of said items, when fetched, is a new item to be sorted,
 reformatting means for reformatting each new item from said memory unit means as a reformatted new item where said reformatted new items have predetermined field boundaries and field orders,
 a plurality of buffer stores, each for storing a different one of said reformatted new items as a buffered item,
 a plurality of comparators, each for comparing a buffered item with a new reformatted item,
 address means for storing a different item address for each of said buffered stores, said address means storing item addresses in an address sequence which defines a buffer store sequence,
 selection means for connecting said buffered stores to said comparators under control of said address means, said item addresses determining which buffered stores are connected to which comparators,
 transfer means for transferring item addresses in said address means in response to outputs from said comparators so as to transfer between each i th item address and its adjacent i + 1 th item address having a corresponding buffer with a higher order stored item to establish said address sequence as a sorted order of item addresses, said sorted order of item addresses defining said buffer store sequence which forms an ordered sequence of buffered items,
 means for storing search control fields,
 comparator means for comparing said item control fields and said search control fields, and
 control means responsive to said comparator means for inhibiting an item from being included in a sort operation when said item control fields and said search control fields do not compare.

* * * * *